US012684537B2

(12) United States Patent
Sharma et al.

(10) Patent No.: US 12,684,537 B2
(45) Date of Patent: Jul. 14, 2026

(54) SYSTEMS AND METHODS FOR DYNAMIC BASE STATION UPLINK/DOWNLINK FUNCTIONAL SPLIT CONFIGURATION MANAGEMENT

(71) Applicant: Outdoor Wireless Networks LLC, Richardson, TX (US)

(72) Inventors: Sunit Kumar Sharma, Groton, MA (US); Irfaan Ahamed Salahuddeen, Acton, MA (US); Stuart D. Sandberg, Acton, MA (US); Boaz Pianka, Lexington, MA (US); Arthur J. Barabell, Sudbury, MA (US); Pradeep Prabhu, Tyngsboro, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 279 days.

(21) Appl. No.: 18/702,611

(22) PCT Filed: Oct. 20, 2022

(86) PCT No.: PCT/US2022/078464
§ 371 (c)(1),
(2) Date: Apr. 18, 2024

(87) PCT Pub. No.: WO2023/070055
PCT Pub. Date: Apr. 27, 2023

(65) Prior Publication Data
US 2025/0071736 A1 Feb. 27, 2025

Related U.S. Application Data

(60) Provisional application No. 63/270,435, filed on Oct. 21, 2021, provisional application No. 63/270,434, filed on Oct. 21, 2021.

(51) Int. Cl.
| H04W 28/02 | (2009.01) |
| H04W 72/04 | (2023.01) |
| H04W 72/541 | (2023.01) |

(52) U.S. Cl.
CPC ....... *H04W 72/04* (2013.01); *H04W 28/0236* (2013.01); *H04W 72/541* (2023.01)

(58) Field of Classification Search
CPC .......... H04W 28/0236; H04W 72/541; H04W 88/085; H04W 24/02; H04L 25/0232;
(Continued)

(56) References Cited

U.S. PATENT DOCUMENTS

| 2020/0287785 A1* | 9/2020 | Barabell ............... H04W 24/02 |
| 2021/0105125 A1* | 4/2021 | Rajagopal ............. H04W 72/23 |

FOREIGN PATENT DOCUMENTS

| WO | 2019175835 A1 | 9/2019 |
| WO | 2023070055 A1 | 4/2023 |

OTHER PUBLICATIONS

International Searching Authority, "International Search Report and Written Opinion", dated Feb. 10, 2023, from PCT Application No. PCT/US2022/078464, pp. 1 through 9, Published: WO.
(Continued)

*Primary Examiner* — David E Lotter
(74) *Attorney, Agent, or Firm* — Fogg & Powers LLC

(57) ABSTRACT

Systems and methods for dynamic base station functional split configuration management are provided. In one embodiment, a system for base station functional split management for uplink fronthaul traffic comprises: a baseband controller coupled to a plurality of radio units via a fronthaul network, wherein the plurality of radio units comprise a signal zone from which uplink signals are combined by the base station: a split controller configured to dynamically select and control a functional split of a respec-
(Continued)

tive uplink receive chain between the baseband controller and each of the plurality of radio units: wherein the functional split defines a demarcation point on the receive chain prior to which processing operations are executed by a radio unit and after which processing operations are executed by the baseband controller: wherein the split controller selects between a plurality of functional split options to dynamically control the functional split and the demarcation point.

20 Claims, 15 Drawing Sheets

(58) Field of Classification Search
CPC ......... H04L 25/03159; H04L 25/03318; H04L 49/351; H04L 49/352; H04L 27/2626; H04L 27/2647
See application file for complete search history.

(56) References Cited

OTHER PUBLICATIONS

Liumeng Wang et al., "Flexible Functional Split and Power Control for Energy Harvesting Cloud Radio Access Networks", IEEE Transactions on Wireless Communications, vol. 19, No. 3, Nov. 28, 2019, pp. 1 through 30.

O-RAN Alliance, "O-RAN.WG7.OMC-HAR 0-v01.00, Technical Specification, O-RAN White Box Hardware Working Group Outdoor Micro Cell Hardware Architecture and Requirements (FR1) Specification", Jun. 2021, pp. Cover through 38.

Veronica Quintuna Rodriguez et al., "Cloud-RAN functional split for an efficient fronthaul network", 2020 International Wireless Communications and Mobile Computing (IWCMC), Jul. 27, 2020, pp. 1 through 7.

* cited by examiner

900

| Decision Criteria | Choice-1 | Choice-2 | Choice-3 | Choice-4 |
|---|---|---|---|---|
| RU support | O-RAN Split | - | - | |
| Small DU<>RU latency | Early Split | Delayed Split | Modulation Split | O-RAN |
| Limited FH bandwidth | Early Split | Delayed Split | Modulation Split | O-RAN |
| High Coding Rate - PDSCH | Delayed Split | Early Split | Modulation Split | O-RAN |
| Low Coding Rate – PDSCH | Early Split | Delayed Split | Modulation Split | O-RAN |
| Low Power RU | O-RAN | Modulation Split | Delayed Split | Early Split |
| Loaded DU | Early Split | Delayed Split | Modulation Split | O-RAN |

Fig. 9

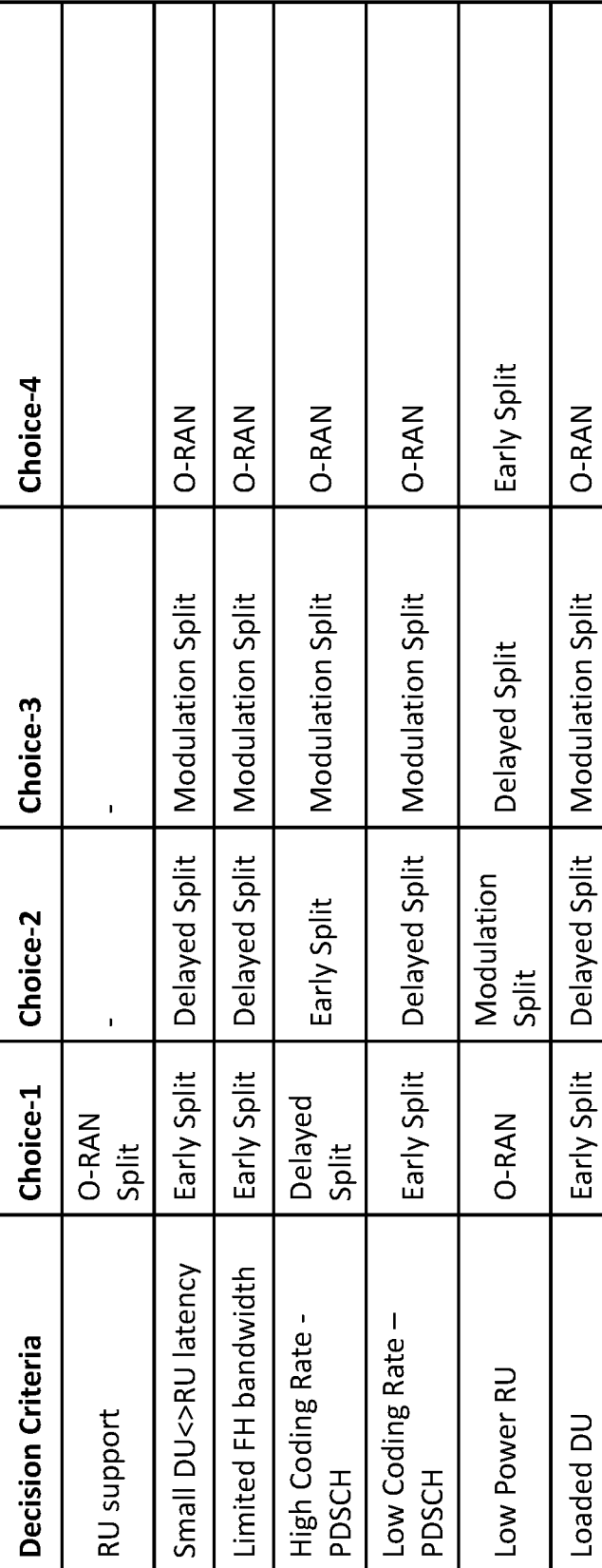

| Modulation Order | Range of Multipliers | Standard (O-RAN) Compression Bits per RE | Expanded Bit Depth Bits per RE Required |
|---|---|---|---|
| QPSK | -1, +1 | 2 bit per RE | 4 bits per RE |
| 16 QAM | -3, -1, +1, +3 | 4 bits per RU | 6 bits per RE |
| 64 QAM | -7, -5, -3, -1, +1, +3, +5, +7 | 6 bits per RE | 8 bits per RE |
| 256 QAM | -15, -13, -11, -9, -7, -5, -3, -1, +1, +3, +5, +7, +9, +11, +13, +15 | 8 bits per RE | 10 bits per RE |

Fig. 10

| QPSK IQ Symbol | O-RAN Scheme | Expanded Bit Depth Scheme |
|---|---|---|
| 1+1i | 0 | b0101 (0x5) |
| 1-1i | 1 | b0111 (0x7) |
| -1+1i | 2 | b1101 (0xD) |
| -1-1i | 3 | b1111 (0xF) |

Fig. 10A

SYSTEMS AND METHODS FOR DYNAMIC BASE STATION UPLINK/DOWNLINK FUNCTIONAL SPLIT CONFIGURATION MANAGEMENT

CROSS-REFERENCE TO RELATED APPLICATIONS

This application is a U.S. National Stage of Internation Patent Application No. PCT/US2022/078464, filed on Oct. 20, 2022, and titled "SYSTEMS AND METHODS FOR DYNAMIC BASE STATION UPLINK/DOWNLINK FUNCTIONAL SPLIT CONFIGURATION MANAGEMENT," which claims priority to U.S. Provisional Application No. 63/270,434, filed on Oct. 21, 2021, and titled "SYSTEMS AND METHODS FOR DYNAMIC BASE STATION UPLINK FUNCTIONAL SPLIT CONFIGURATION MANAGEMENT" and U.S. Provisional Application No. 63/270,435, filed on Oct. 21, 2021, and titled "SYSTEMS AND METHODS FOR DYNAMIC BASE STATION DOWNLINK FUNCTIONAL SPLIT CONFIGURATION MANAGEMENT," the contents of which are incorporated herein in their entirety.

BACKGROUND

Cloud-based virtualization of Fifth Generation (5G) base stations (also referred to as "gNodeBs" or "gNBs") is widely promoted by standards organizations, wireless network operators, and wireless equipment vendors. Such an approach can help provide better high-availability and scalability solutions as well as addressing other issues in the network.

In general, a distributed 5G gNodeB can be partitioned into different entities, each of which can be implemented in different ways. For example, each entity can be implemented as a physical network function (PNF) or a virtual network function (VNF) and in different locations within an operator's network (for example, in the operator's "edge cloud" or "central cloud"). A distributed 5G gNodeB can be partitioned into one or more central units (CUs), one or more distributed units (DUs), and one or more radio units (RUs). The CU and DUs together are referred to as a baseband controller (BC). Each CU can be further partitioned into a central unit control-plane (CU-CP) and one or more central unit user-planes (CU-UPs) dealing with the gNodeB Packet Data Convergence Protocol (PDCP) and above layers of functions of the respective planes, and each DU configured to implement the upper part of physical layer through radio link control (RLC) layer of both control-plane and user-plane of gNodeB. In this example, each RU is configured to implement the radio frequency (RF) interface and lower physical layer control-plane and user-plane functions of the gNodeB. Each RU is typically implemented as a physical network function (PNF) and is deployed in a physical location where radio coverage is to be provided. Each DU is typically implemented as a virtual network function (VNF) and, as the name implies, is typically distributed and deployed in a distributed manner in the operator's edge cloud. Each CU-CP and CU-UP is typically implemented as a virtual network function (VNF) and, as the name implies, is typically centralized and deployed in the operator's central cloud.

In some implementations, each base station is configured to wirelessly communicate with each UE served by the base station using a respective subset of the RUs used with that base station. This respective subset of RUs for each UE is also referred to here as the "signal zone" (SZ) for that UE. In such implementations, downlink data is wirelessly transmitted to a given UE by wirelessly transmitting that downlink data from the RUs included in that UE's signal zone, and uplink data is wirelessly received from a given UE by combining data received at the RUs included in that UE's signal zone. The SZ used for transmitting data to a UE may be different from the SZ used for receiving data from the UE.

This type of base station can also be configured to support frequency reuse. "Frequency reuse" in the downlink refers to situations where separate downlink data intended for different UEs is simultaneously wirelessly transmitted to the UEs using the same physical resource blocks (PRBs) for the same cell but using different RUs. Frequency reuse in the uplink refers to situations where separate uplink data simultaneously wirelessly transmitted from different UEs using the same PRBs for the same cell is received using different RUs. In such situations, the reuse UEs are also referred to here as being "in reuse" with each other. For those PRBs where frequency reuse is used, each of the multiple reuse UEs is served by a different subset of the RUs, where no RU is used to serve more than one UE for those reused PRBs.

Cloudification and virtualization of network elements for a 5G gNodeB brings in a lot of benefits but also introduces challenges with respect to the fronthaul network through which the DUs and RUs communicate uplink and downlink user data and control traffic. For example, proposed use cases employing multiple-input multiple-output (MIMO) RU configurations and frequency reuse techniques complying with the standard open radio access network (O-RAN) function split can result in projected fronthaul traffic to exceed the 10 Gbps Ethernet bandwidth capacity of the fronthaul network.

SUMMARY

The embodiments of the present disclosure provide systems and methods for dynamic base station uplink split configuration management and will be understood by reading and studying the following specification.

In one example, a system for base station functional split management for uplink fronthaul traffic comprises: a baseband controller coupled to a plurality of radio units via a fronthaul network, wherein the plurality of radio units comprise a signal zone from which uplink signals are combined by a base station; a split controller configured to dynamically select and control a functional split of a respective uplink receive chain between the baseband controller and each of the plurality of radio units; wherein the functional split defines a demarcation point on the uplink receive chain prior to which processing operations are executed by a radio unit and after which processing operations are executed by the baseband controller; wherein the split controller selects between a plurality of functional split options to dynamically control the functional split and the demarcation point.

In another example, a method for base station functional split management for uplink fronthaul traffic, wherein a base station comprises a baseband controller coupled to a plurality of radio units via a fronthaul network, wherein the plurality of radio units comprise a signal zone from which uplink signals are combined by the base station, the method comprising: determining one or more current operating parameters or conditions; dynamically selecting, based on the one or more current operating parameters or conditions, a functional split of a respective uplink receive chain between the baseband controller and each of the plurality of radio units, wherein the functional split defines a demarcation point on the uplink receive chain prior to which processing operations are executed by a radio unit and after which processing operations are executed by the baseband controller; wherein a split controller selects between a plurality of functional split options to dynamically control the functional split and the demarcation point.

In another example, a system for base station functional split management for downlink fronthaul traffic comprises: a baseband controller coupled to a plurality of radio units via a fronthaul network; a split controller configured to dynamically select and control a functional split of a respective downlink transmit chain between the baseband controller and each of the plurality of radio units; wherein the functional split defines a demarcation point on the downlink transmit chain prior to which processing operations are executed by the baseband controller and after which processing operations are executed by a radio unit; wherein the split controller selects between a plurality of functional split options to dynamically control the functional split and the demarcation point.

In another example, a method for base station functional split management for downlink fronthaul traffic, wherein a base station comprises a baseband controller coupled to a plurality of radio units via a fronthaul network, the method comprising: determining one or more current operating parameters or conditions; dynamically selecting, based on the one or more current operating parameters or conditions, a functional split of a respective downlink transmit chain between the baseband controller and each of the plurality of radio units, wherein the functional split defines a demarcation point on the downlink transmit chain prior to which processing operations are executed by the baseband controller and after which processing operations are executed by a radio unit; wherein a split controller selects between a plurality of functional split options to dynamically control the functional split and the demarcation point.

DRAWINGS

Embodiments of the present disclosure can be more easily understood and further advantages and uses thereof more readily apparent, when considered in view of the description of the preferred embodiments and the following figures in which:

FIG. 9 is a diagram illustrating an example decision table that may be utilized by a split controller for selecting a functional split option.

FIGS. 10 and 10A are diagrams illustrating an example expanded bit-depth compression embodiment.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
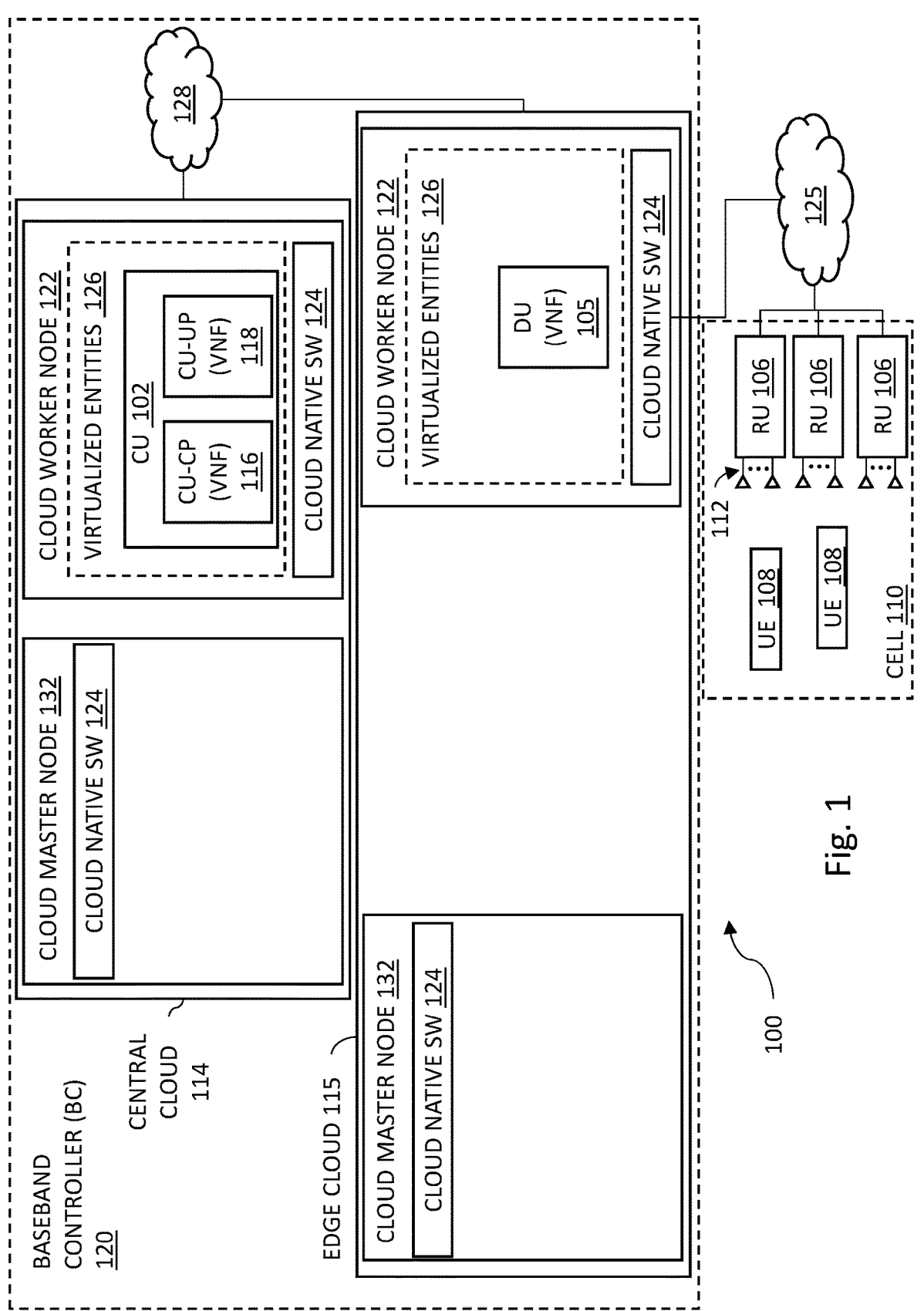
FIGS. 1 and 1A are diagrams illustrating an example wireless base station embodiment.
Figure 1A:
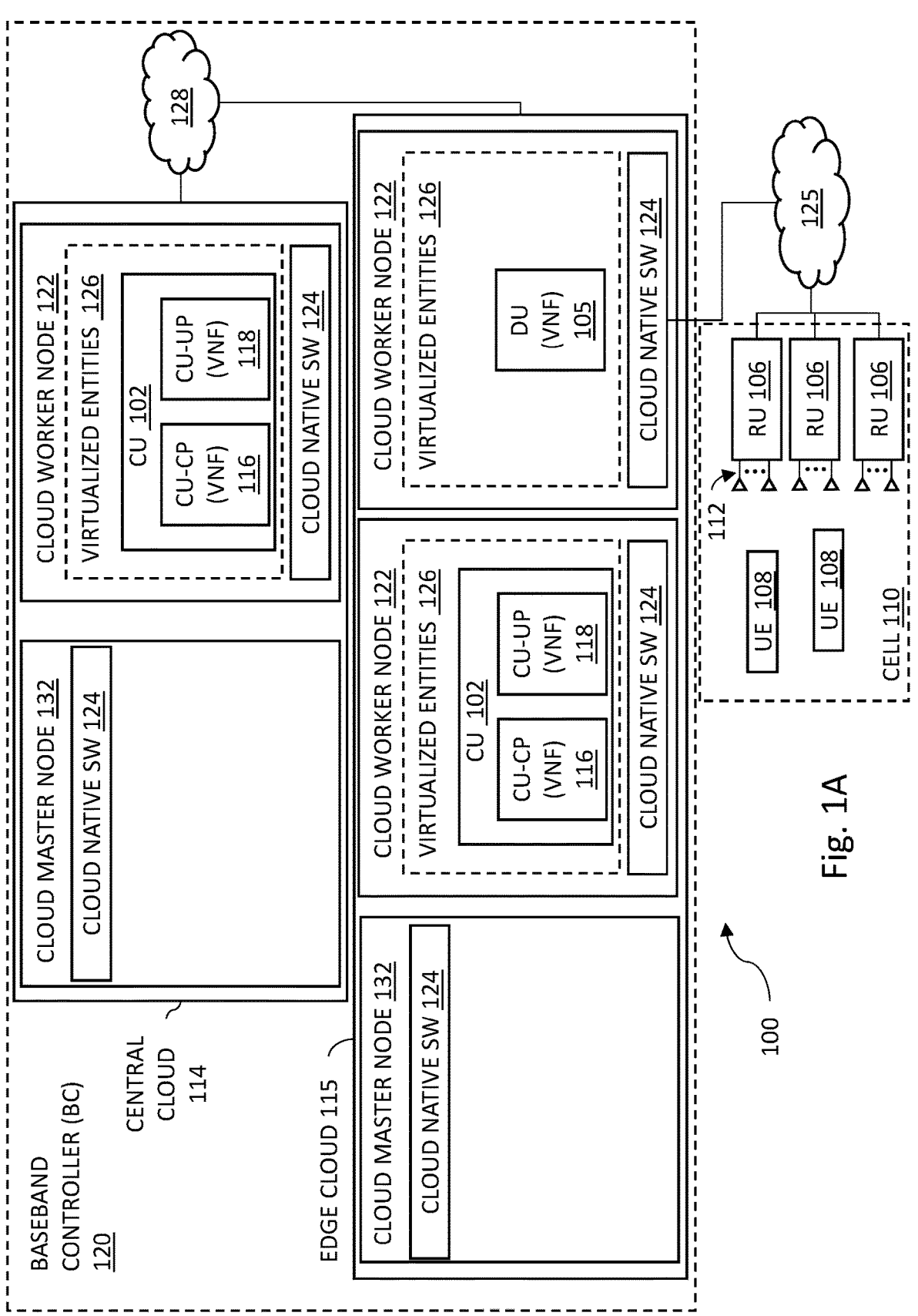

FIGS. 1 and 1A are block diagrams illustrating examples of a virtualized wireless base station 100 on a VNF hosting platform on which the radio units described herein may be utilized. In the context of a fourth generation (4G) Long Term Evolution (LTE) system, a base station 100 may also be referred to as an "evolved NodeB" or "eNodeB", and in the context of a fifth generation (5G) New Radio (NR) system, may also be referred to as a "gNodeB." Base station 100 may be referred to as something else in the context of other wireless interfaces. Moreover, the radio units (RUs) discussed herein may alternately be described in different implementations as radio points (RPs) or remote antenna units (RAUs).

In the particular examples shown in FIGS. 1 and 1A, the virtualized wireless base station 100 comprises a 5G gNodeB 100 partitioned into one or more central units (CUs) 102, which include a central unit control-plane (CU-CP) 116 and one or more central unit user-planes (CU-UPs) 118. In this example, the CU-CP 116 and CU-UPs 118 are both implemented as VNFs, but may be implemented in other ways in other implementations. The gNodeB 100 is further partitioned into one or more distributed units (DUs) and one or more radio units (RUs) 106. In this example, the DUs 105 are composed of one or more DUs 105, but may be implemented in other ways in other implementations.

In this example the virtualized 5G gNodeB 100 is configured so that each CU 102 is configured to serve one or more DUs 105 and each DU 105 is configured to serve one or more RUs 106. In the particular configuration shown in FIGS. 1 and 1A, a single CU 102 serves a single DU 105, and the DU 105 serves three RUs 106. However, the particular configurations shown in FIGS. 1 and 1A are only examples. In other embodiments, other numbers of CUs 102, DUs 105, and RUs 106 can be used. Also, the number of DUs 105 served by each CU 102 can vary from CU 102 to CU 102. Likewise, the number of RUs 106 served by each DU can vary from DU 105 to DU 105.

Moreover, although the following embodiments are primarily described as being implemented for use to provide 5G NR service, it is to be understood that the techniques described here can be used with other wireless interfaces (for example, fourth generation (4G) Long-Term Evolution (LTE) service) and references to "gNodeB" used in this disclosure can be replaced with the more general term "base station" or "base station entity" and/or a term particular to the alternative wireless interfaces (for example, "enhanced NodeB" or "eNB"). Furthermore, it is also to be understood that 5G NR embodiments can be used in both standalone and non-standalone modes (or other modes developed in the future), and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein refer to layers of the wireless interface (for example, 5G NR or 4G LTE) used for wireless communication between a base station and user equipment). The CU 102 implements Layer 3 and non-real-time critical Layer 2 functions for the base station 100. Each DU 105 is configured to implement the time-critical Layer 2 functions and at least some of the Layer 1 (also referred to as the Physical Layer) functions for the base station 100. In this example, each RU 106 is configured to implement a radio frequency (RF) interface 184 and Layer 1 functions for the base station 100 that are not implemented in the DU 105.

In general, the virtualized gNodeB 100 is configured to provide wireless service to various numbers of user equipment (UEs) 108 using one or more cells 110 (only one of which is shown in FIGS. 1 and 1A for ease of illustration). Each RU 106 includes or is coupled to a respective set of one or more antennas 112 via which downlink RF signals are radiated to UEs 108 and via which uplink RF signals transmitted by UEs 108 are received.

In one configuration (used, for example, in indoor deployments), each RU 106 is co-located with its respective set of antennas 112 and is remotely located from the DU 105 and CU 102 serving it as well as the other RUs 106. In another configuration (used, for example, in outdoor deployments), the respective sets of antennas 112 for multiple RUs 106 are deployed together in a sectorized configuration (for example, mounted at the top of a tower or mast), with each set of antennas 112 serving a different sector. In such a sectorized configuration, the RUs 106 need not be co-located with the respective sets of antennas 112 and, for example, can be co-located together (for example, at the base of the tower or mast structure) and, possibly, co-located with its serving DUs 105. Other configurations can be used.

The virtualized gNodeB 100 is implemented using a scalable cloud environment to define a baseband controller (BC) 120 in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The BC 120 can be implemented in various ways.

For example, the BC 120 can be implemented using hardware virtualization, operating system virtualization, and application virtualization (also referred to as containerization) as well as various combinations of two or more of the preceding. The BC 120 can be implemented in other ways. For example, as shown in FIGS. 1 and 1A, the BC 120 is implemented in a distributed manner. That is, the BC 120 is implemented as a distributed scalable cloud environment 120 comprising at least one central cloud 114 and at least one edge cloud 115.

In the examples shown in FIGS. 1 and 1A, each RU 106 is implemented as a physical network function (PNF) comprising radio transceiver circuitry and is deployed in or near a physical location where radio coverage is to be provided. In this example, each DU is implemented with one or more DU virtual network functions (VNFs) and may be distributed and deployed in a distributed manner in the edge cloud 115. Each CU-CP 116 and CU-UP 118 is implemented as a virtual network function (VNF). The CU-CP 116 and CU-UP 118 may be centralized and deployed in the central cloud 114 as shown in FIG. 1. FIG. 1A illustrates an alternative implementation to FIG. 1 where the CU-CP 116 and CU-UP 118 are instead deployed in the edge cloud 115. In the examples shown in these FIGS. 1 and 1A, the CU 102 (including the CU-CP 116 and CU-UP 118) and the entities used to implement it are communicatively coupled to each DU 105 served by the CU 102 (and the VNFs used to implement each such DU 105). In some embodiments, the CU 102 and DU 105 are communicatively coupled over a midhaul network 128 (for example, a network that supports the Internet Protocol (IP)). In the examples shown in FIGS. 1 and 1A, each the DUs 105 used to implement a DU are communicatively coupled to each RU 106 served by the DU 105 using a fronthaul network 125 (for example, a switched Ethernet network that supports the IP).

The scalable cloud environment utilized for BC 120 comprises one or more cloud worker nodes 122 that are configured to execute cloud native software 124 that, in turn, is configured to instantiate, delete, communicate with, and manage one or more virtualized entities 126 of a base station (for example, a CU-CP 116, CU-UP 118, and DU 105 for a gNodeB 100). The cloud worker nodes 122 may comprise respective clusters of physical worker nodes (or virtualized worker nodes if implemented in combination with hardware virtualization), the cloud native software 124 may comprise a shared host operating system, and the virtualized entities 126 comprise containers. In another example, the cloud worker nodes 122 comprise respective clusters of physical worker nodes, the cloud native software 124 comprises a hypervisor (or similar software), and the virtualized entities 126 comprise virtual machines.

In the example shown in FIGS. 1 and 1A, the scalable cloud environment for BC 120 includes a cloud "master" node 132. There are certain responsibilities that the cloud "master" node 132 has as far as instantiation of cloud worker nodes 122 and clustering them together. The cloud master node 132 is configured to implement management and control plane processes for the worker nodes 122 in a cluster. In some examples, the cloud master node 132 is configured to determine what runs on each of the cloud worker nodes 122, which can include scheduling, resource allocation, state maintenance, and monitoring. In some examples, the cloud master node is configured to manage the lifecycle, scaling, and upgrades of workloads (such as containerized applications) on the cloud worker nodes 122.

Each of the virtual network functions, DU 105, CU-CP 116, and CU-UP 118 is implemented as a software virtualized entity 126 that is executed in the scalable cloud environment 120 on a cloud worker node 122 under the control of the cloud native software 124 executing on that cloud worker node 122. In the following description, a cloud worker node 122 that implements at least a part of a CU 102 (for example, a CU-CP 116 and/or a CU-UP 118) is also referred to here as a "CU cloud worker node" 122, and a cloud worker node 122 that implements at least a part of a DU 105 is also referred to here as a "DU cloud worker node" 122.

In the example embodiment of a gNodeB 100 base station, the CU-CP 116 and the CU-UP 118 are each implemented as a respective virtualized entity 126 executing on the same cloud worker node 122. The DU 105 may be implemented as a virtualized entity 126 executing on the same cloud worker node 122 or a different cloud worker node 122. In other configurations and examples, the CU 102 can be implemented using multiple CU-UPs 118 using multiple virtualized entities 126 executing on one or more cloud worker nodes 122. In another example, multiple DUs 105 (using multiple virtualized entities 126 executing on one or more cloud worker nodes 122) can be used to serve a cell, where each of the multiple DUs 105 serves a different set of RUs 106. Moreover, it is to be understood that the CU 102 and DU 105 can be implemented in the same cloud (for example, together in an edge cloud 115). Other configurations and examples can be implemented in other ways. The various VNFs are configured to be activated to make them service ready using for example, service configurations with an Operations and Maintenance (OAM) entity or Device Management System (DMS).

Figure 2:
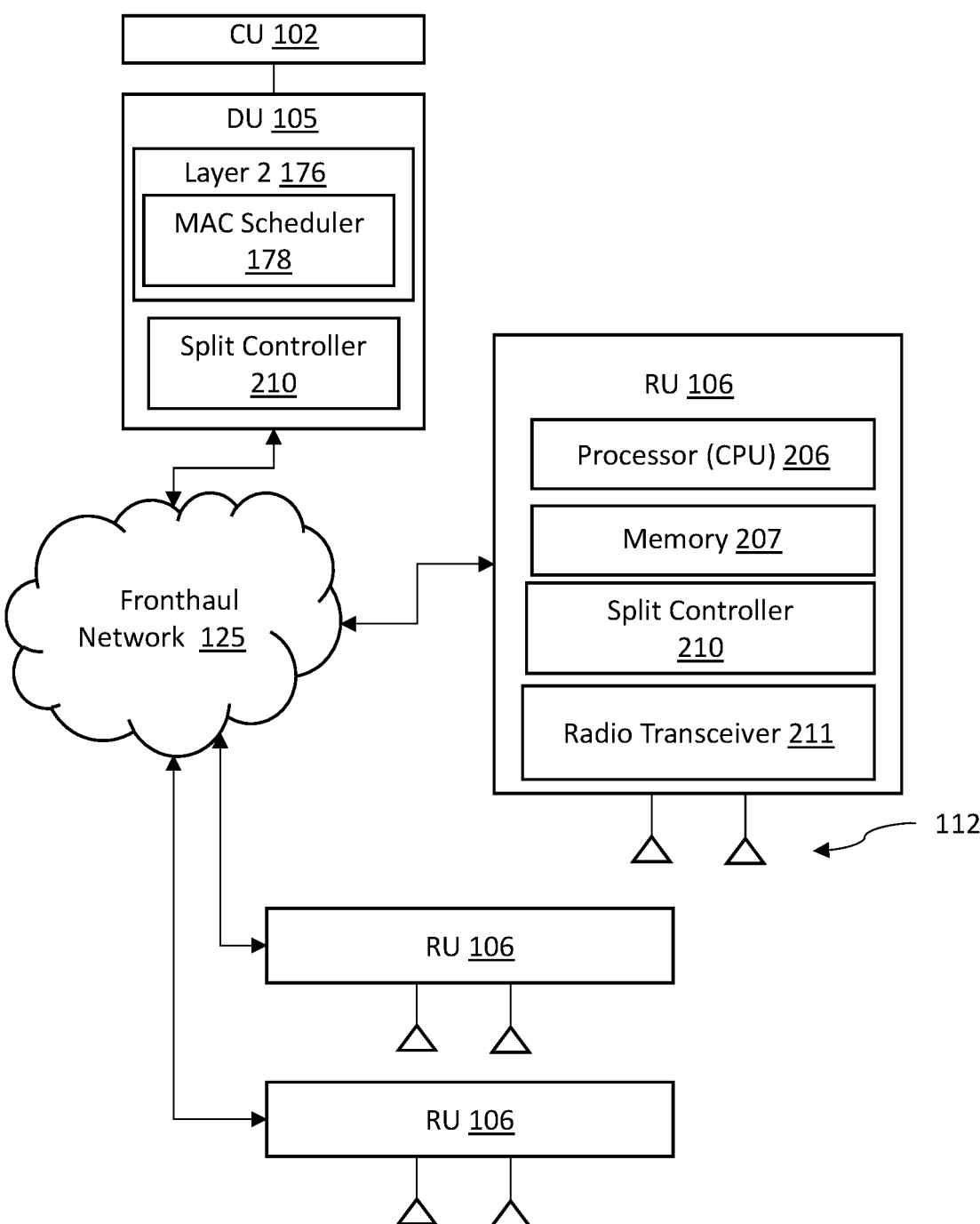
FIG. 2 is a diagram illustrating an example wireless base station.

The base station 100 is configured to support frequency reuse. As noted above, "frequency reuse" in the downlink refers to situations where separate downlink user data intended for different UEs 108 is simultaneously wirelessly transmitted to the UEs 108 using the same physical resource blocks (PRBs) for the same cell 110 but using different RUs 106. Frequency reuse in the uplink refers to situations where separate uplink data simultaneously wirelessly transmitted from different UEs 108 using the same PRBs for the same cell 110 is received using different RUs 106. Such reuse UEs 108 are also referred to here as being "in reuse" with each other. For those PRBs where frequency reuse is used, each of the multiple reuse UEs 108 is served by a different subset of the RUs 106, where no RU 106 is used to serve more than one UE 108 for those reused PRBs FIG. 2 illustrates the example of an RU 106 that is deployed and coupled to the DU 105 via fronthaul network 125. DU 105 is implemented by one or more virtualized entities 126 configured to execute code to realize aspects of the DU 105 in operation as discussed herein. RU 106 comprises a processor 206 (for example, a central processing unit (CPU)) and a memory 207 which together store and execute code to realize aspects of the RU 106 in operation as discussed herein. The RU 106 also includes radio transceiver 211 circuitry (which may comprise, for example, amplifiers, RF filters, frequency converters, and the like) to implement uplink and downlink communication paths.

Figure 3:
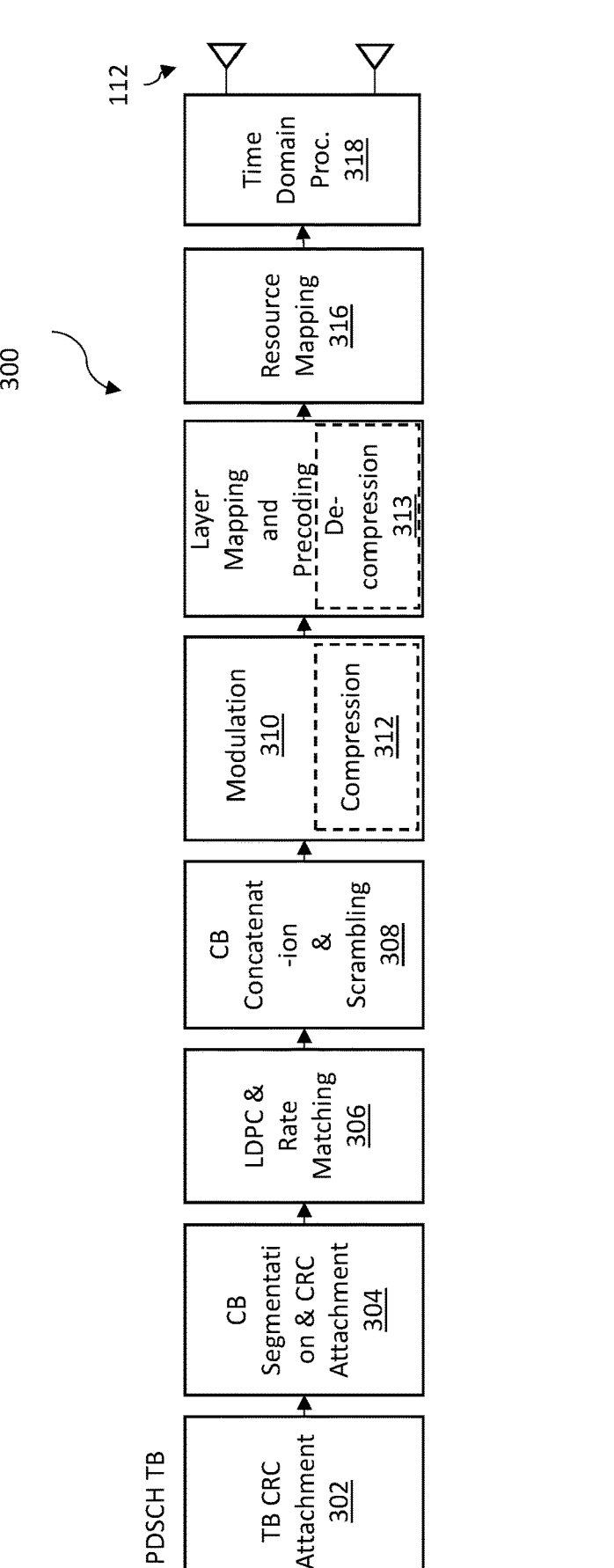
FIG. 3 is a diagram illustrating an example transmit chain processing operations for a Physical Downlink Shared Channel (PDSCH).
Figure 4:
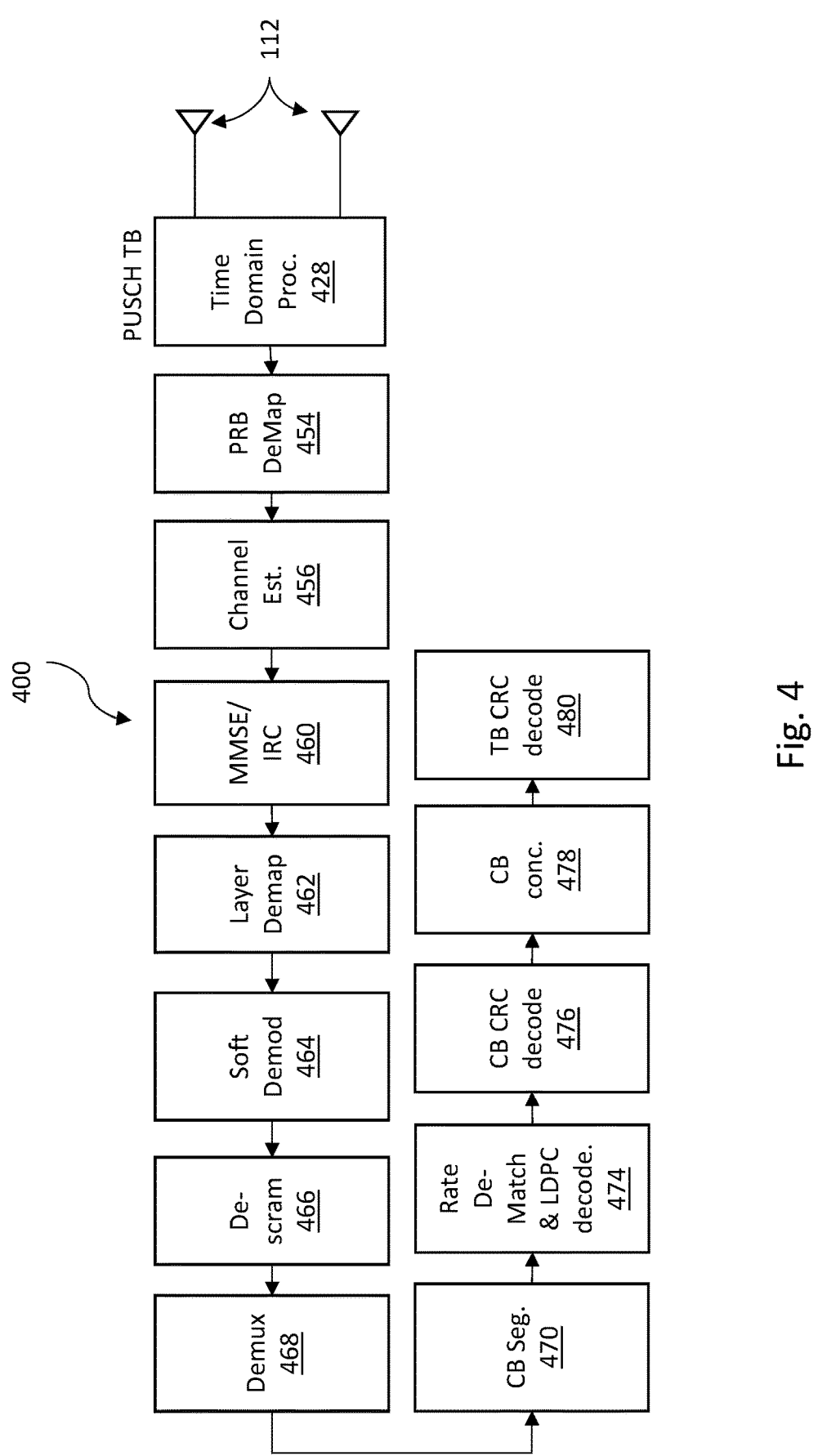
FIG. 4 is a diagram illustrating an example receive chain processing operations for a Physical Uplink Shared Channel (PUSCH).

For the transmit and receive chains illustrated by FIGS. 3 and 4, the amount of fronthaul traffic generated from uplink and downlink communications between the DU 105 and an RU 106 can vary as a function of which DU/RU functional split is being used. In particular, FIG. 3 illustrates various physical-layer operations specified for 5G NR for a transmit chain 300 for a Physical Downlink Shared Channel (PDSCH), and FIG. 4 illustrates various physical-layer operations specified for 5G NR for a receive chain 400 for a Physical Uplink Shared Channel (PUSCH).

The physical-layer processing operations shown in FIGS. 3 and 4 are individually described in the 3GPP specifications (either explicitly or, in the case of some receive chain operations, implicitly by inverting the individual description of the corresponding transmit chain operations). It is to be understood that FIGS. 3 and 4 each illustrate only one example and that the present disclosure can be used with other wireless interfaces (for example, 4G LTE). Moreover, embodiments disclosed herein may be used to dynamically control DU/RU functional split configurations with other physical channels (for example, the Physical Broadcast Channel (PBCH), Physical Downlink Control Channel (PDCCH), Physical Random Access Channel (PRACH), and Physical Uplink Control Channel (PUCCH)).

DU/RU functional split configurations may further be applied to still other physical channels such as but not limited to, Demodulation Reference Signal (DMRS), Primary Secondary Signal (PSS), Secondary Synchronization Signal (SSS) and/or Channel State Information Reference Signal (CSI-RS).

It should be understood that additional operations not shown in FIGS. 3 and 4 may also be included, for example, to support fronthaul transmission (for example, IQ compression decompression). Also, the particular sequence of operations may differ from what is shown in FIGS. 3 and 4. For example, the sequence of operations is dependent on the functional DU/RU functional split used between the DU 105 and RU 106 (or similar entities) and the type of RU 106 employed as discussed below.

Base stations typically implement the physical-layer processing operations individually in accordance with the 3GPP specifications, with each of the various physical-layer processing operations described in the 3GPP specifications being implemented as a discrete, separate operation. The input for each such discrete operation is either the output of a different physical-layer operation or the output of the MAC layer (for the downlink) or the RF block (for the uplink). The data used as the input for each discrete operation is typically read from memory, and the data that is output by each discrete operation is typically written to memory. Also, each such discrete operation typically performs its processing on a transport-block-by-transport-block basis, buffering data as necessary. However, as noted above, with the conventional approach, at least some hardware acceleration is typically necessary in order to meet the stringent timing requirements specified for the wireless interface, which makes the conventional approach less suitable for deployment in cloud-based environments.

With the embodiment described herein, the DU/RU functional split refers to a demarcation point that defines which physical-layer operations are performed by the DU 105, and which physical-layer operations are performed by the RU 106. It should be noted that the demarcation point for the transmit chain 300 may be different than for the receive chain 400. Problems or disadvantages that can develop from a non-optimized DU/RU functional split in the transmit chain 300 include: 1) High traffic levels or congestion on the fronthaul network 125 (where in some use cases the traffic may exceed the 10 Gbps bandwidth capacity of the fronthaul network); 2) Limited scalability (for example, features like carrier aggregation and frequency reuse are processing resource intensive and may strain the processing capabilities of the DU 105); 3) RU processing underutilization (for example, an RU may be equipped with relatively powerful processing resources that are not fully utilized); 4) Inefficient locality utilization (for example, it should be straightforward for an RU 106 to manage downlink retransmissions to a UE 108 as needed (because the UE 108 is in closer proximity to the RU 106 than the DU 105), but under the standard open radio access network (O-RAN) split utilizing the RU 106 for this purpose cannot be realized); 5) The standard O-RAN split does not provide the RU 106 with the ability to address individual UEs.

Referring now to FIG. 3, the physical layer processing operations are illustrated for the transmit chain 300 for the PDSCH in accordance with some embodiments of the present disclosure. The physical layer processing operations for the transmit chain 300 for the PDSCH include a transport block (TB) Cyclic Redundancy Code (CRC) attachment operation 302, a code block (CB) segmentation and CRC attachment operation 304, a low density parity check (LDPC) channel coding and rate matching operation 306, a code block (CB) concatenation and scrambling operation 308, a modulation operation 310 that may include a compression operation 312 (optional depending on selected split), layer mapping (LM) and precoding operation 314 that may include a decompression operation (optional, depending on whether compression operation 312 is utilized), a resource element mapping operation 316, and a time domain processing operation 318 (which may include an inverse fast Fourier transform (IFFT) and cyclic prefix (CP) addition operations).

In one exemplary implementation for the 5G NR PDSCH operations shown in FIG. 3, the computationally intensive channel coding operations, including, for example, the transport block CRC attachment operation 302, the code block segmentation and CRC attachment operation 304, and LDPC channel coding 306 may be combined and replaced with a single transfer function that is configured to map each of the universe (or set) of relevant, valid inputs to the transport block CRC attachment operation 302 to a corresponding output of LDPC channel coding 306.

FIG. 4 illustrates example physical layer processing operation blocks for a receive chain 400 for the PUSCH in accordance with some embodiments of the present disclosure. The physical layer processing operations for the receive chain 400 for the PUSCH include a time domain processing operation 428 (which may include fast Fourier transform (FFT) and/or cyclic prefix (CP) removal operations), a physical resource block (PRB) de-mapping operation 454, a channel estimation and interpolation operation 456, a Minimum Mean Square Error (MMSE)/Interference Rejection Combining (IRC) equalization and combiner operation 460, a layer de-mapping operation 462, a soft demodulation operation 464, a de-scrambling operation 466, and a user and control data demultiplexing operation 468. For the user data, the receive chain 400 further includes a code block (CB) segmentation operation 470, a rate de-matching and LDPC channel decoding operation 474, a code block CRC decoding operation 476, a code block concatenation operation 478, and a transport block CRC decoding operation 480.

In another exemplary implementation for the 5G NR PUSCH operations shown in FIG. 4, the computationally intensive channel de-coding operations, including, for example, the rate de-matching operation, the LDPC decoding operation, the code block CRC decoding operation 476, the code block concatenation operation 478, and the transport block CRC decoding operation 480 may be combined and replaced with a single transfer function that is configured to map each of the universe (or set) of relevant, valid inputs to the rate de-matching operation to a corresponding output of the transport block CRC decoding operation 480.

With embodiments of the present disclosure, the base station 100 comprises a split controller 210 (for example, an L1 split controller) that manages the DU/RU functional split demarcation point for the transmit chain 300 and receive chain 400. In some embodiments, the functions of the split controller 210 may be distributed between the DU 105 and the RU 106, as shown in FIG. 2. For example, in some embodiments, functions of the split controller 210 are implemented as a part of the Layer 2 functions 176 implemented by the DU 105. This can be implemented as a part of a MAC scheduler 178 implemented in the DU 105. In some embodiments, the split controller 210 may be at least partially implemented in the RU 106 as one or more applications executed by the processor 206.

The DU/RU functional split demarcation point may be determined at setup (for example, manually selected by a technician) or dynamically determined and reconfigured by the split controller 210 during runtime in response to changing parameters or conditions. For example, the DU/RU functional split demarcation point may be determined for a given protocol data unit (PDU) (such as, DLSCH, downlink control information (DCI), management information block (MIB), for example) based on consideration such as DU load, system load, subcarrier spacing, arrival time, fronthaul bandwidth and/or congestion, RU processing capacity, inter-switch link capacity, scaling considerations, and/or equipment interoperability. Additionally, the DU/RU functional split can also be chosen based on the application type, one example would be if there is a desire to serve ultra-reliable low latency communications (URLLC) UEs.

Figure 5:
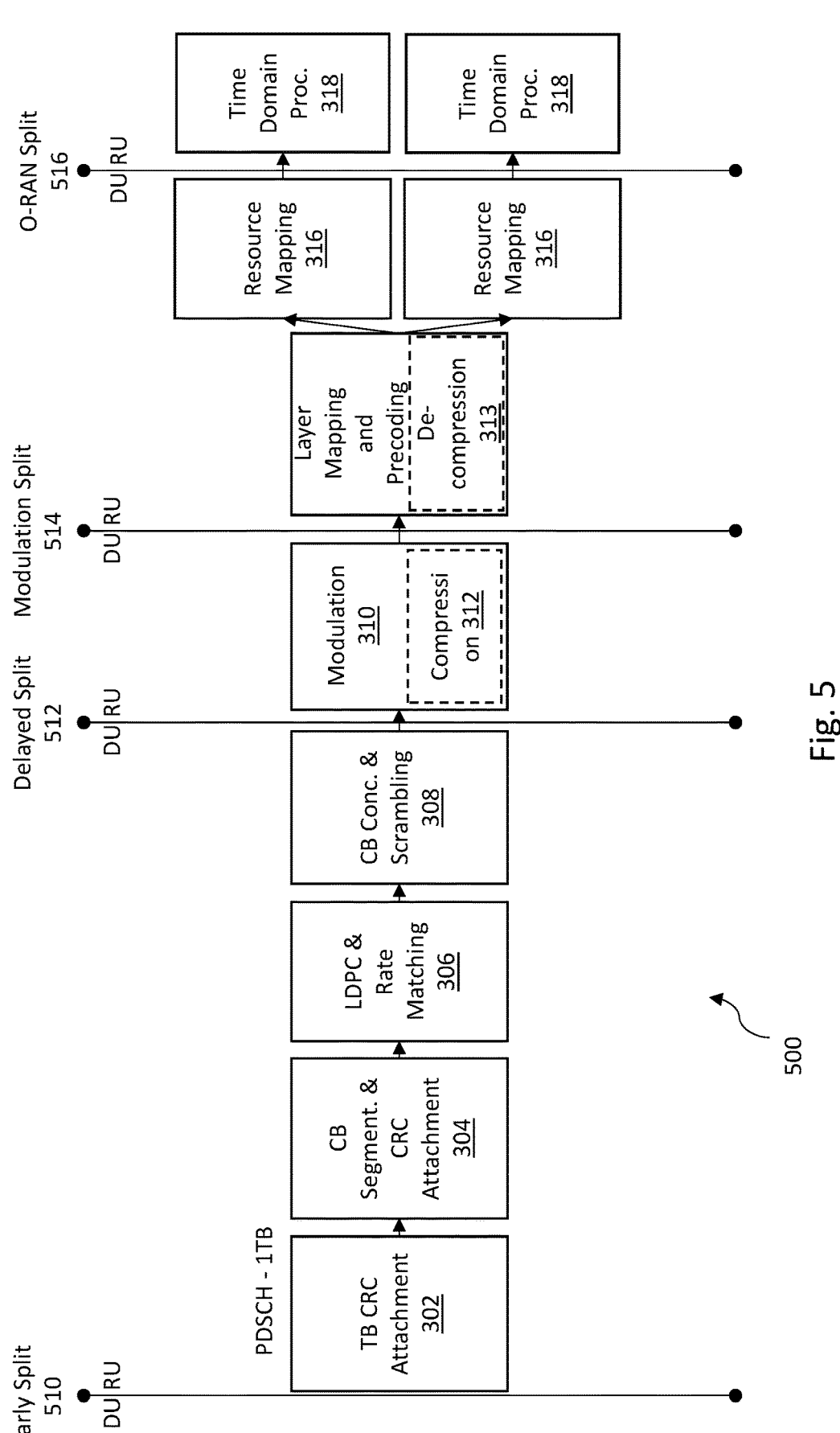
FIG. 5 is a diagram illustrating example transmit chain DU/RU functional split options for a Physical Downlink Shared Channel (PDSCH).

FIG. 5 illustrates at 500 example DU/RU functional splits that may be dynamically implemented by the split controller 210 at different points in a PDSCH processing chain (such as processing chain 300 shown in FIG. 3). In this example, a PDSCH processing chain is illustrated for a single transport block (TB) assuming 4×4 mode, 270 PRBs, and a maximum code rate, with four spatial multiplexing (SM) layer mapped to four RU 106 antennas 112. However, the transmit processing chain may instead comprise other configurations of TBs, SM layers, code rates, and RU antennas. For example, in some embodiments the PDSCH processing chain may instead comprise two TBs with eight spatial multiplexing (SM) layers that are mapped to mapped antennas 112 at the RU 106. It should be understood that the functional splits illustrated in FIG. 5 are intended as non-limiting examples and other splits between other operational processes may be implemented.

For the example of FIG. 5, the least amount of fronthaul 125 data traffic is generated when the split controller 210 selects DU/RU functional split Option-1 (shown at 510), which is referred to herein as the "early split" 510. With the early split 510, the DU 105 simply forwards the PDSCH payloads to the RU 106. In other words, all of the processing blocks of the processing chain 300 are performed by algorithms executed by the processor 206 of the RU 106. The early split 510 fully offloads downlink processing from the DU 105 to RU 106 so that the DU 105 can spend its processing capacity for uplink or other tasks. It also generates the lowest fronthaul 125 traffic and is close to the total sector throughput. This option can yield reduced jitter buffer between the DU 105 and RU 106, and L1 scaling is only limited by number of RUs 106 coupled to the DU 105 since each RU 106 act as an independent processing element. The early split 510, however, relies heavily on ample processing capacity at the RU 106 and may be less appropriate when the processing capacity at the RU 106 is limited.

The DU/RU functional split Option-2, which is referred to herein as the "delayed split" 512 generates only a little more traffic on the fronthaul network 125 than the early split 510. Here, the DU 105 performs the processing blocks and encodes DL channels up to scrambling 308. In other words, the DU 105 performs the processing blocks prior to modulation 310. The scrambled payload is sent to RU 106 to execute the modulation 310 operation and the remaining processing blocks of the processing chain 300. The delayed split 512 can be selected by the split controller 210 for instances where the processing capacity of the DU 105 is scalable so that processing tasks for the processing chain 300 can be evenly divided between the DU 105 and the RU 106. The delayed split 512 also supports small subcarrier spacing (for example, spacing of 15 kHz or 30 kHz) with increased duration time slots where the DU 105 has the adequate capacity to process such downlink data. The delayed split 512 also results in a lower fronthaul 125 traffic rate compared to a standard O-RAN split so that L1 scaling is also possible with this option. That said, the delayed split 512 may be limited in practicality in applications where a delayed availability of MAC PDUs at the DU 105 can overload the processing at the DU 105, thus interfering with the processing of an upcoming slot.

The DU/RU functional split Option-3, which is referred to herein as the "modulation split" 514, has processing through the modulation 310 and the optional compression 312 processing blocks performed at the DU 105. The resulting modulated and compressed data is transported via the fronthaul 125 to the RU 106 to execute the balance of the processing blocks of the processing chain 300. In some embodiments, the compression performed at 312 may comprise standard O-RAN compression techniques. In other embodiments, the compression 312 may comprise an expanded bit depth compression as discussed below. The modulation split 514 can result in the generation of less fronthaul traffic than the O-RAN split when compression 312 is performed at the DU 105, and therefore may be utilized to reduce fronthaul 125 traffic in cases where the RU 106 has excess in computing capacity, but not a sufficient excess to implement a delayed split 512. Like the delayed split 512, the modulation split 514 may be limited in practicality in applications where a delayed availability of MAC PDUs at the DU 105 can overload the processing at the DU 105, thus interfering with the processing of an upcoming slot.

The DU/RU functional split Option-4 comprises what is referred to as the standard O-RAN 7.2 split (and can be either Category-A or Category-B), which is referred to herein as the "O-RAN split" 516. With the O-RAN split 516, time domain processing 318 is performed at the RU 106, but the prior processing operations are performed at the DU 105. Although the O-RAN split 516 produces the highest fronthaul 125 traffic rate, and may limit the use and scalability of features such as frequency reuse as discussed above, the split controller 210 may still select the O-RAN split 516 for several reasons. For example, the split controller 210 may select the O-RAN split 516 where the RU 106 does not have the processing capacity to execute the algorithms for performing the modulation split 514. The split controller 210 may select the O-RAN split 516 where it detects that the RU 106 is an O-RAN 7.2 compliant device and does not comprise split controller 210 or other functionality capable of implementing the other split options.

Figure 5A:
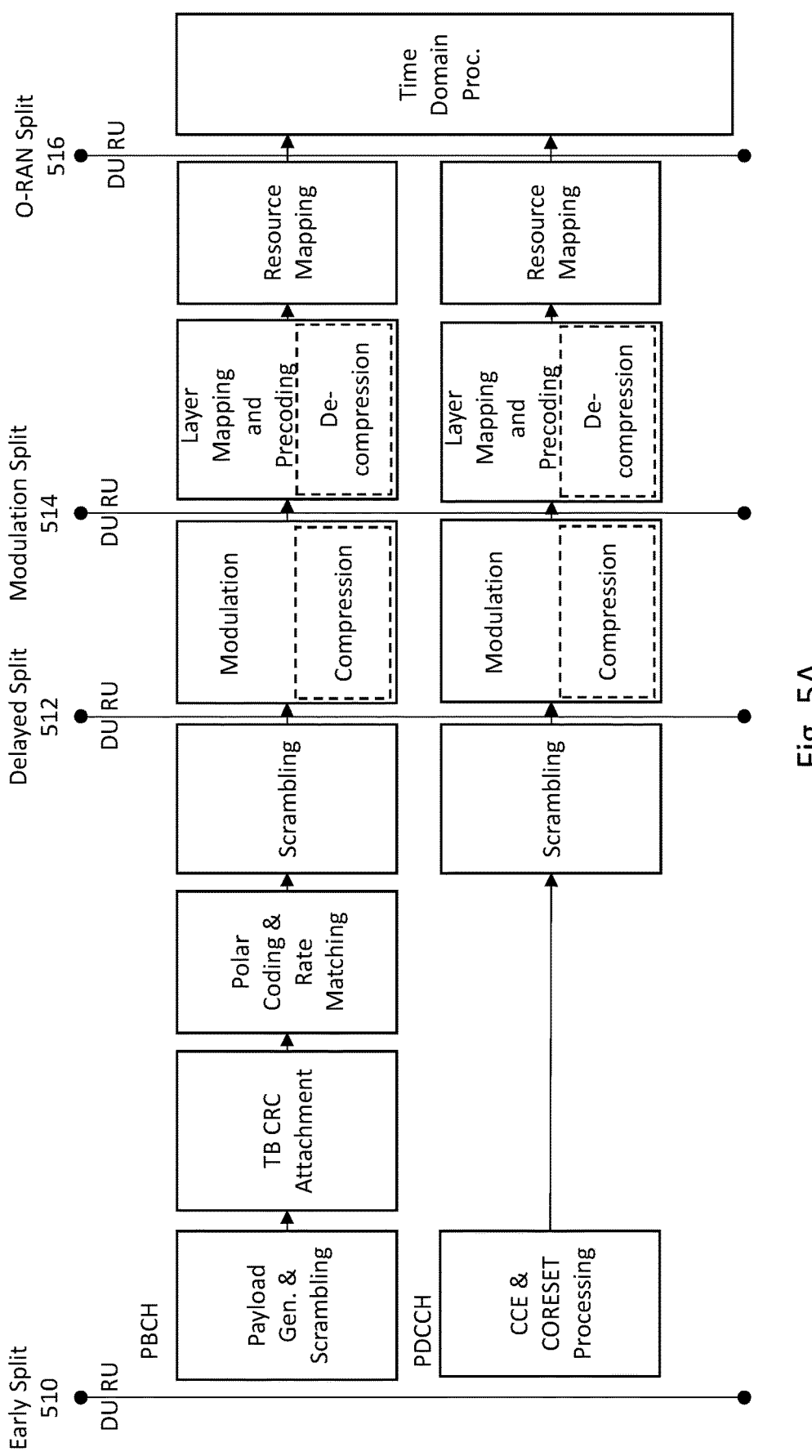
FIG. 5A is a diagram illustrating example transmit chain DU/RU functional split options for a Physical Broadcast Channel (PBCH) and Physical Downlink Control Channel (PDCCH).

It should be appreciated that the split controller 210 can also manage the DU/RU functional split between other payloads communicated between the DU 105 and RU 106 in addition to the PDSCH. For example, DU/RU functional splits for the Physical Broadcast Channel (PBCH), Physical Downlink Control Channel (PDCCH), Physical Random Access Channel (PRACH), Physical Uplink Shared Channel (PUSCH), and Physical Uplink Control Channel (PUCCH) payloads can each respectively be dynamically controlled and adjusted by the split controller 210 in the same or similar manner as described with respect to FIG. 5. In each case, the split controller 210 can dynamically, or at the time of system startup, determine where the demarcation point is located, based on manually entered settings, or detected current system and/or fronthaul network parameters and operating conditions. For example, FIG. 5A illustrates demarcation points for early split 510, delayed split 512, modulation split 514, and O-RAN split 516 configurations for PBCH and PDCCH payloads. The fundamental demarcation points of the DU/RU functional split are equivalent in each case. That is, the early split 510 places the most processing burden on the RU 106 (forwarding the baseline channel data on the fronthaul 125) while the O-RAN split 516 places the least processing burden on the RU 106 (only the time domain processing performed at the RU). For the modulation split 514 (or demodulation split in the case of uplink traffic), the fronthaul 125 carries modulated (and optionally compressed) payloads.

In some embodiments, the DU/RU functional split for uplink fronthaul traffic may involve the split controller 210 taking additional or alternate factors into consideration. As an example, for uplink fronthaul traffic, a consideration may be to establish a DU/RU functional split that meets an optimum signal-to-noise ratio (SNR) for a target block error rate (BLER) performance while at same time reducing fronthaul 125 throughput between the RU 106 and DU 105. For LTE base stations, it should be understood that references to the DU 105 in this description would instead refer to the eNB. In some embodiments, an optimum DU/RU functional split on an uplink data channel will be picked by split controller 210 for each UE 108 individually in a slot (for 5G) or subframe (for 4G) based on initial measurements from a physical random access channel (PRACH), sounding reference signal (SRS) channel, and/or a physical uplink control channel (PUCCH), which can be considered in conjunction with knowledge of the split controller 210 regarding how many RU 106 form a particular signal zone (combining zone) in which uplink signals are being combined.

It should be appreciated that an absence of macro RF interference and reuse RF interference neglects gains that would be realized from having interference rejection combining (IRC) implemented in the DU 105. That said, the same IRC performance can be obtained through minimum mean square error (MMSE) combining of the antennas 112 at all RUs 106, and then later combining equalized symbols at the DU 106. In that case, the RUs 106 could send an average noise variance per PRB as side info (as discussed below).

Even in the presence of macro or reuse RF interference, a sub-optimal but still advantageous solution is to perform IRC at the RU's antennas 112 and MMSE RU combining at the DU 105. The advantage of the split controller 210 applying such a DU/RU functional split would be the reduction in fronthaul 125 throughput as well as reduced processing load at the DU 105. In other embodiments, IRC across the plurality or RU 106 in a combining zone can also be optionally executed at one of the base station's RUs 106 by opening up one or more communications channels between the RUs 106 so that they can communicate with each other. In some embodiments, for UEs 108 that are not participating in multi-RU combining in the uplink, the split controller 210 can adjust the DU/RU functional split so that uplink decoding operations can be completely offloaded to the RU 106 so that traffic with decoded bits is transported over the fronthaul 125 to the DU 105.

Figure 6:
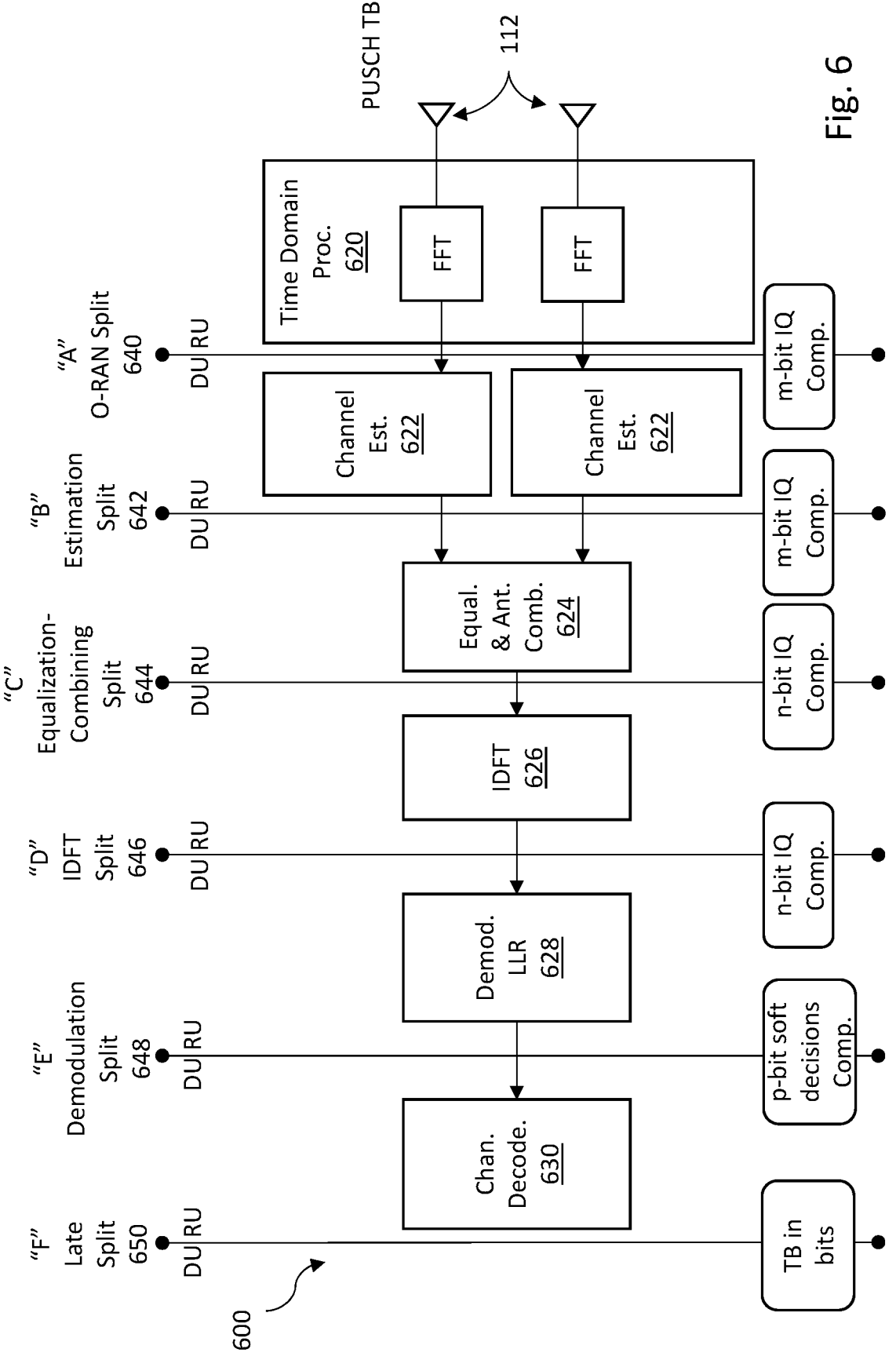
FIG. 6 is a diagram illustrating example transmit chain DU/RU functional split options for a Physical Uplink Shared Channel (PUSCH).

FIG. 6 provides an alternate illustration at 600 of an uplink receive chain for a Physical Uplink Shared Channel (PUSCH) such as previously illustrated in FIG. 4. In FIG. 6, the primary processing blocks of interest include a time domain processing operation 620 (which may include fast Fourier transform (FFT) and/or cyclic prefix (CP) removal operations), channel estimation and interpolation operation 622, equalization and antenna combining operation 624, an inverse discrete Fourier transform (IDFT) operation 626 (which would be optional as being applicable for single-carrier frequency-divisional multiple access (SC-FDMA) waveforms), a demodulation log-likelihood ratio (LLR) operation 628, and a channel decoding operation 630.

In FIG. 6, split option A demarks the standard O-RAN split, and this is referred to herein as the O-RAN split 640. As discussed above, with this uplink O-RAN split 640, time domain processing 620 is performed at the RU 106, but the remaining processing operations of the uplink receive chain are performed at the DU 105. In some embodiments, the IQ symbols output of the FFT operation are compressed to m bits before transmission over the fronthaul 125. For an O-RAN compliant implementation, the m bit compression would comprise 9-bit compression, but other implementations may utilize other m values. The compression ratio achieved by the compressions discussed herein is defined as the ratio of compressed symbols transmitted over the fronthaul 125 to the IQ symbol rate as observed received at the RU antenna 112. As such, the achieved compression ratio is independent of the number of antennas, SM layers, modulation, coding and transport block (TB) size. A lower compression ratio translates to a lower data rate on the fronthaul network 125. High performance gain is obtained from the O-RAN split 640 because the uplink signals from multiple RU 106 are combined at the DU 105. With this functional split option, multiple antennas originated from different RUs 106 can also be combined at the DU 105 using IRC. In absence of RU combining, other functional split options can be expected to achieve better fronthaul rate with the same performance.

In FIG. 6, split option B is equivalent to option A, except that channel estimation 622 and associated modules are moved from being executed on the DU 105 to the RU 106, to reduce processing load on the DU 105. This is therefore referred to herein as the estimation split 642. The fronthaul 125 data rate for an estimation split 642 will be higher than the O-RAN split 640, not only because traffic comprising compressed channel estimates are now on the transported on the fronthaul 125, but additional traffic is generated to transmit estimated noise for the MMSE equalizer to measure. An estimation split 642 therefore may be selected by the split controller 210 to help to reduce processing load on the DU 105, but at the cost of increased throughput on the fronthaul 125. The channel estimation and IQ symbols output of the FFT operation may also be compressed in this split option to m bits before transmission over the fronthaul 125.

Split option C comprises performing the uplink processing operations at the RU 106 up to equalizing and combining antennas operation 624. This is therefore referred to herein as the equalization-combining split 644. Equalized symbols along with side information is sent over fronthaul 125 for processing or multi-RU combining at the DU 105. At the equalizing and combining antennas operation 624 performed at the RU 106, the received signals at each RU antenna 112 are equalized and combined before transmission on the fronthaul 125. Each RU 106 performs IRC for its own antennas 112 (which may include sets of 2, 4, 8, etc. antennas). With the equalization-combining split 644, equalized samples along averaged noise variance per antenna 112 are transmitted as side information over fronthaul 125 to achieve MMSE equalization and achieve RU combining at the DU 105. The compression ratio efficiency of this option is independent of the number of RU antennas 112 and the modulation scheme, but does vary depending on the SM layers. Better compression is obtained from the equalization-combining split 644 than the O-RAN split 640 with an option of multi RU combining at the DU 105 using MMSE equalization. The IQ symbols output of the equalizing and combining antennas operation 624 may also be compressed in this split option to n bits before transmission over the fronthaul 125.

The expression below provides an example function illustrating how equalized symbols c can be estimated and combined from each RU 106 at the DU 105.

$$\hat{X} = \frac{\hat{H}_1^* * (\sigma_1^2)^{-1} * Y_1 + \hat{H}_2^* * (\sigma_2^2)^{-1} * Y_2 + \ldots + \hat{H}_n^* * (\sigma_n^2)^{-1} * Y_n}{|\hat{H}_1|^2 \cdot (\sigma_1^2)^{-1} + |\hat{H}_2|^2 \cdot (\sigma_2^2)^{-1} + \ldots + |\hat{H}_n|^2 \cdot (\sigma_n^2)^{-1} + 1}$$

where $\hat{H}$ is channel frequency response, $$\sigma_n^2$$

is noise variance, Y is IQ for data symbols, and $\hat{X}$ is equalized & combined symbols. In this equation, the numerator is quantized to 8 bit I & Q per sub-carrier and transmitted over the fronthaul 125 along with 4 bytes of side information, averaged per the PRB scale factor by the denominator.

Split option D comprises performing the uplink processing operations at the RU 106 up to the IDFT operation 626, thus operationally performing IDFT calculations on the RU 106 to further reduce processing load on the DU 105. This is therefore referred to herein as the IDFT split 646. This additional processing would be applicable for implementations that have DFT-precoded uplink traffic (such as for SC-FDMA), and the resulting the fronthaul 125 data rate is equivalent as for the equalization-combining split 644. The IQ symbols output of the IDFT operation 626 may also be compressed in this split option to n bits before transmission over the fronthaul 125.

Split option E comprises performing the uplink processing operations at the RU 106 up though the demodulation LLR operation 628 and thus referred to herein as the demodulation split 648. Demodulation is performed at the RU 106 and the demodulated soft decisions per layer are transmitted over the fronthaul 125 to the DU 105. At the DU 105, soft decisions from multiple RUs 106 are received and combined prior to the channel decoding 630 to improve SNR performance. The compression ratio archived by the demodulation split 648 is independent of the RU antennas 112, but will depending on both the modulation used and the number of SM layers, where lower modulation results in higher compression. The soft decisions output of the demodulation LLR operation 628 may also be compressed in this split option to p bits per layer before transmission over the fronthaul 125.

Split option F comprises performing the uplink processing operations at the RU 106 up through the decoding operation 630. With this split, the complete uplink layer-1 processing is performed in the RU 106. This is therefore referred to as the late split 650. Decoding of the demodulated soft decision is done at RU 106, and the resulting decoded bits and decoded transport block is transmitted on the fronthaul 125 to the DU 105. As the DU 105 receives decoded transport blocks from the multiple RUs 106, no RU combining can be performed by the DU 105 with this split option. The late split 650, however, does achieve the lowest compression ratio and thus the lowest fronthaul rate of the various uplink DU/RU functional split options.

Figure 7:
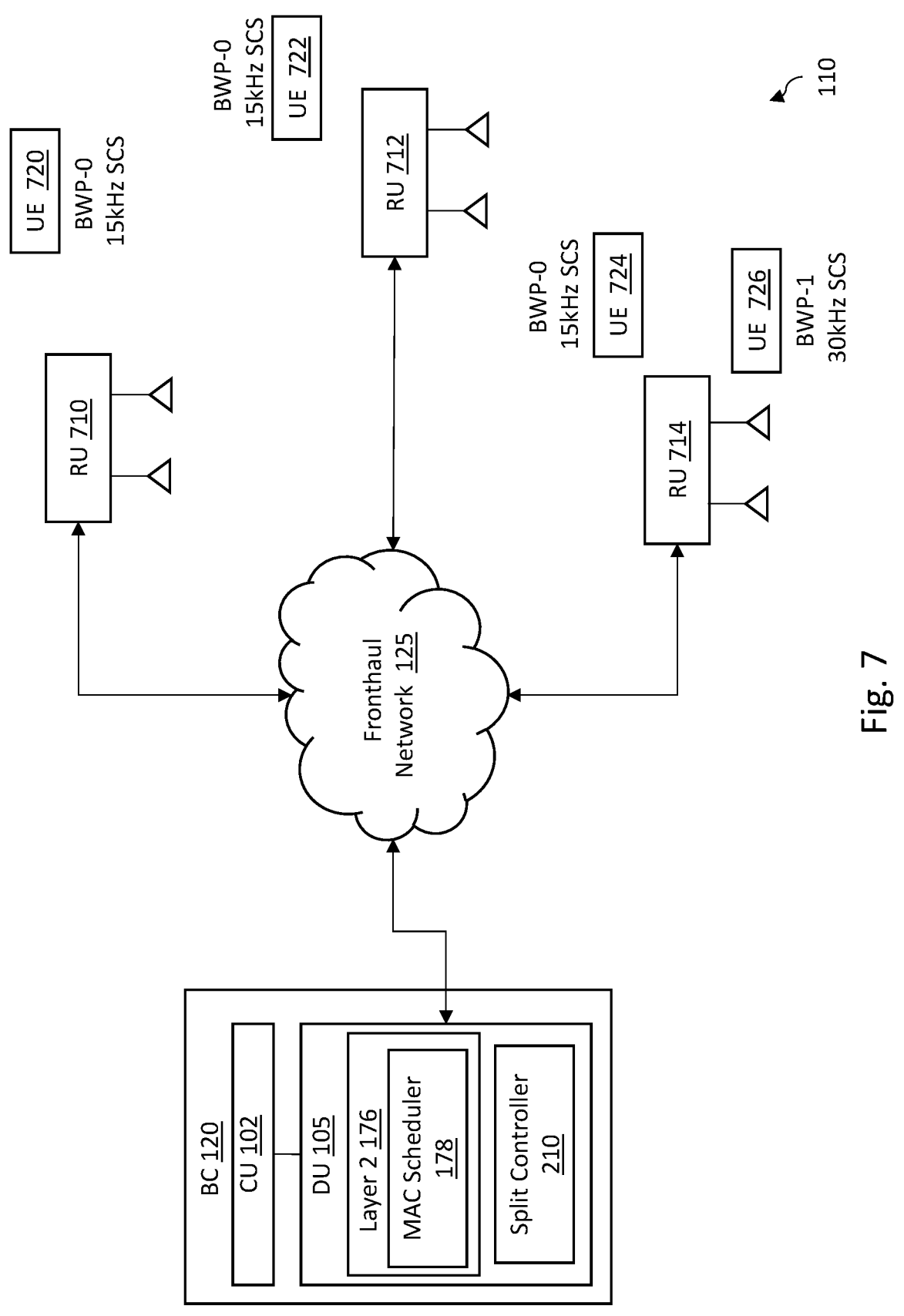
FIG. 7 is a diagram illustrating an example wireless base station.

As discussed above, a baseband controller 120 (for example, a DU) may be coupled to a plurality of RU 106 serving any particular cell 110 and the split demarcation points for each RU 106 may be independently adjusted by the split controller 210. For example, FIG. 7 illustrates a DU 105 coupled via fronthaul network 125 to a first RU 710, a second RU 712 and a third RU 714. In this example, UE 720, UE 722, UE 724, and UE 726 are within a cell 110 served by RU 710, RU 712, and RU 714. UE 720, UE 722, and UE 724 are physically isolated from each other, and therefore can reuse PRBs, which effectively triples the potential traffic carried by the fronthaul network 125. UEs 720, 722, and 724 all utilize a first bandwidth partition (BWP) having a 15 kHz sub-carrier spacing (SCS) shown as BWP-0. UE 726 instead utilizes a second BWP having a 30 kHz SCS shown as BWP-1. In this example, the RU 712 is a relatively low power RU. The split controller 210 may therefore select an O-RAN split for RU 712, or another DU/RU functional split option that does not cause the RU 720 to exceed its processing capacity. The RU 710 and RU 714 both comprise processing capacities that can fully implement any of the possible DU/RU functional split options. Accordingly, the split controller 210 can select split options based on SCS or other considerations. Moreover, the split controller 210 can not only select a functional split option for RU 710 that is different than for RU 712 or RU 714, the split controller 210 can also select split options on a per BWP bases for any one RU. For example, UE 724 communicates via BWP-0 while and UE 726 communicates via the BWP-1. The split controller 210 can select a first DU/RU functional split option on RU 714 tailored for the traffic carried over BMW-0, while also selecting a different second DU/RU functional split option on RU 714 tailored for the traffic carried via BWP-1.

Figure 7A:
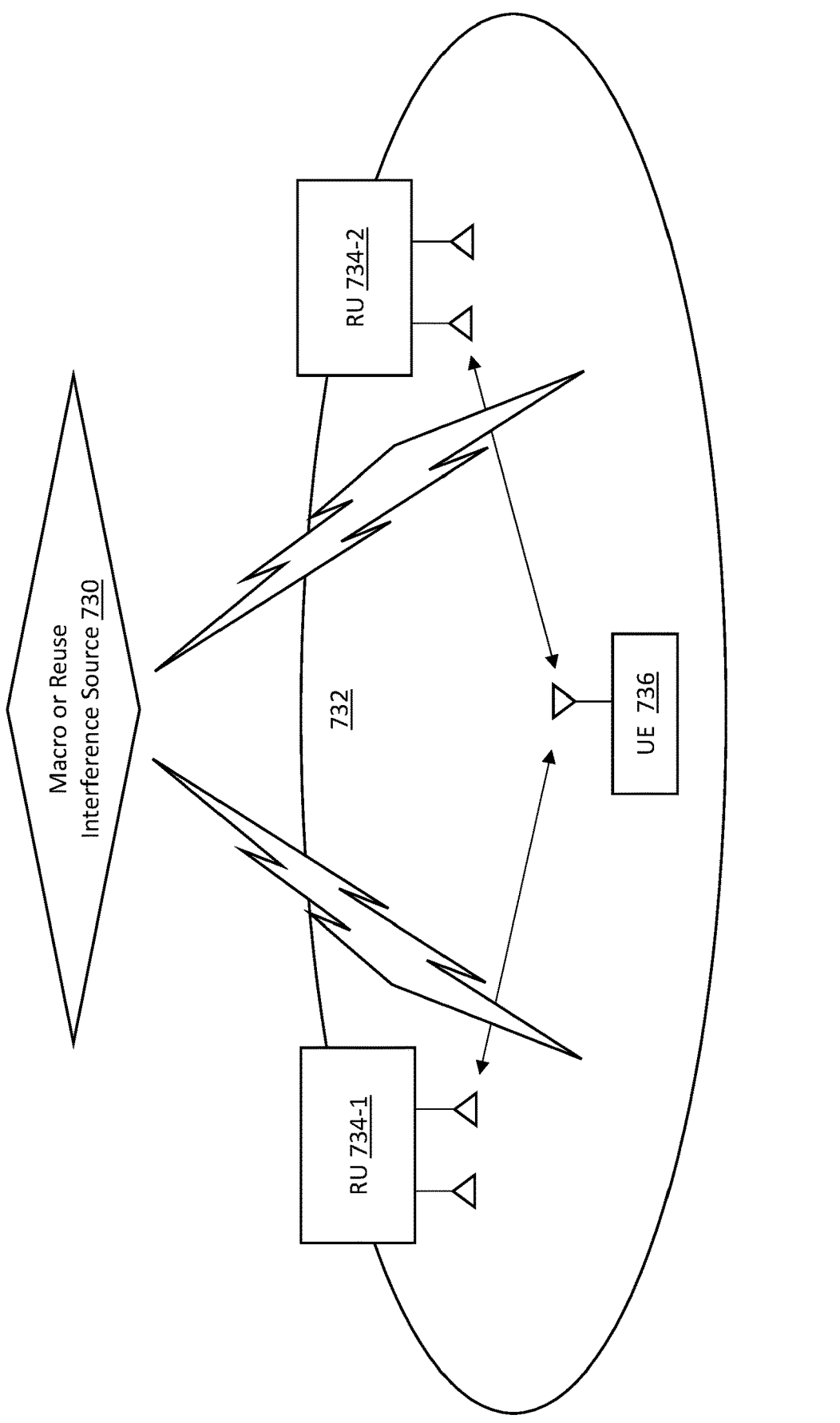
FIGS. 7A and 7B are diagrams that illustrate example dynamic uplink split scenarios for different combinations of RUs and UEs.
Figure 7B:
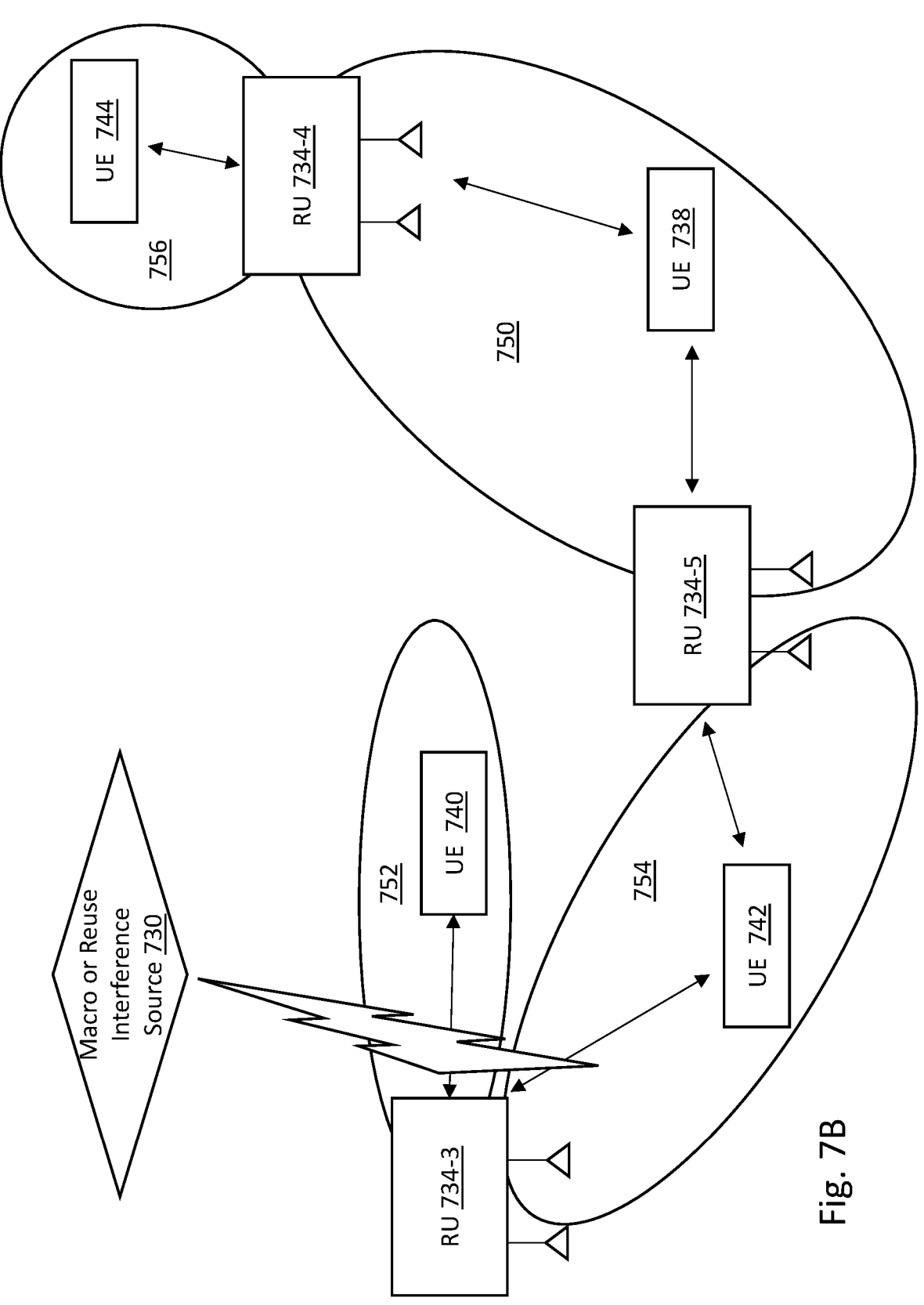

FIGS. 7A and 7B are diagrams that illustrate example dynamic uplink split scenarios for different combinations of RUs and UEs. In FIG. 7A, a first RU (shown at 734-1) and a second RU (shown at 734-2) are both within the combining zone 732 for a UE 736. The contributing RUs are determined by PRACH, SRS, and PUCCH channel processing. In this scenario, there is a macro and/or reuse interference source 730 affecting UE 736's signals with both RU 734-1 and RU 734-2. Here, the split controller 210 may select the split option A (O-RAN split 640) as the optimum configuration since the interference rejection combining of all RU antennas when performed at the DU 105 provides performance gain due to better interference cancellation.

In FIG. 7B, the UE experience either partial or zero macro and reuse interference zones.

Referring to UE 738, it can be seen that RU 734-4 and RU 734-5 are both in the combining zone 750 for this UE. In the absence of interference, the covariance matrix in the IRC receiver at the DU 105 reduces to a diagonal matrix and is therefore effectively equivalent to a MMSE equalizer. The split controller 210 selects a split where this MMSE equalization and combining can be performed at the RUs 734-4 and 734-5 and where combining of uplink signals from the RUs is performed at the DU 105 to achieve fronthaul network 125 traffic reduction. To combine multiple RUs at the DU 105, each RU will send equalized & combined symbols along with averaged noise variance per PRB as side info. Combining the IQ across multiple antennas within each RU saves fronthaul network 125 bandwidth. Here, the split controller 210 may select the split option C (Equalization-Combining split 644) as the optimum configuration, obtaining substantially equivalent performance as split option A (O-RAN split 640) with respect to fronthaul network 125 traffic reduction. Another, but sub-optimal, solution is for the split controller 210 to select split option E (Demodulation Split 648) which performs soft decision combining of the uplink signals from the RUs in the DU 105. This split option E can achieve some fronthaul network 125 traffic savings for lower modulation schemes (for example, QPSK & 16 QAM) than split option C. Note that for 64 QAM modulating, split option C is optimal for both performance and fronthaul network 125 traffic savings.

Referring now to UE 740 in FIG. 7B, there is only RU 743-3 in its combining zone 752, and it is in proximity to macro/reuse interference source 730. In the absence of another RU in combining zone 752, no performance gain would be achieved by sending IQ over the fronthaul network 125 and performing decoding at the DU 105. Accordingly, in this scenario the split controller 210 may select split option F (Late Split 650) for this UE 740 so that fronthaul network 125 savings can be achieved by performing IRC within the RU 734-3.

Referring now to UE 742 in FIG. 7B, the RU 734-3 and RU 734-5 are in combining zone 754 for this UE. RU 734-3 is seeing interference from source 730 and will perform IRC combining across its antennas whereas RU 734-5 is not seeing interference and can perform MMSE combining. In this scenario, the split controller 210 may select either split option C or split option E, which can be used to perform RU combining in DU 105 based on fronthaul network 125 bandwidth availability.

Referring now to UE 744 in FIG. 7B, RU 734-4 is the only RU in the combining zone 756 for this UE. In absence of any interference or another RU in combining zone 756, the split controller 210 may select split option 5 so that decoding is accomplished within the RU 735-4.

Figure 8:
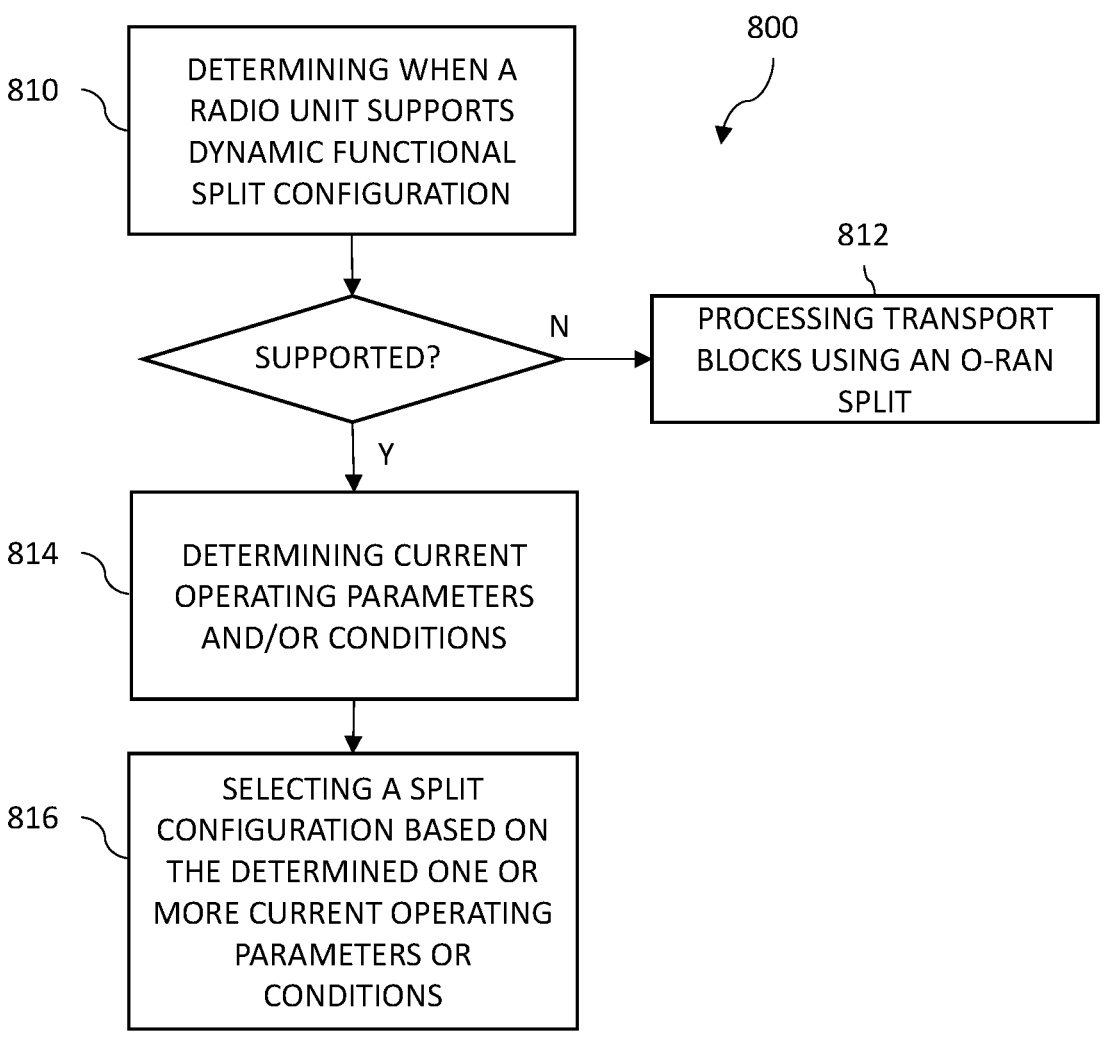
FIG. 8 is a flow chart illustrating an example method of dynamic functional split configuration.

FIG. 8 is a flow chart illustrating a method 800 for dynamic functional split configuration between a baseband controller and radio units for a base station, such as base station 100 disclosed above. It should be understood that method 800 may be implemented using any one of the embodiments described above. As such, elements of method 800 may be used in conjunction with, in combination with, or substituted for elements of any of the embodiments described herein. Further, the functions, structures, features, and other description of elements for such embodiments described herein may apply to like named elements of method 800 and vice versa.

As noted above, a base station can be configured to implement the processing associated with method 800. More specifically, the processing associated with method 800 can be implemented primarily as a part of the Layer 2 functions 176 implemented by the base station 100 (by a split controller that is stand-alone or part of the MAC scheduler 178) and/or applications executed by the processor 206 of the RU 106, with support from the other functions implemented by the base station 100.

The method begins at 810 with determining, with a split controller, when a radio unit supports dynamic functional split configuration. For example, in some embodiments, a RU may not comprise the functionality to implement anything other than the standard O-RAN split. As such, when the RU cannot support dynamic split configuration, the method proceeds to 812 with processing transport blocks using an O-RAN split. When the RU can support dynamic split configuration, the method proceeds to 814 with determining one or more current operating parameters or conditions. These operating parameters or conditions may include base station system factors or fronthaul network factors such as measurements or determinations of base station loading (in particular the baseband controller or DU load), fronthaul bandwidth and/or traffic congestion, subcarrier spacing, RU processing capacity, reuse scaling considerations, UE distributions, and/or equipment interoperability. The method then proceeds to 816 with the split controller selecting a split configuration based on the determined one or more current operating parameters or conditions.

For example, in one embodiment the split controller may make a determination of current base station operating parameters that comprises DU and/or RU loading levels verses their respective processing capacities. If the DU is determined to be loaded above a predetermined threshold (such as above 50 percent processor loading, for example), then the processing capacity of the RU may be evaluated, and a DU/RU functional split configuration option selected that shifts the processing load off from the DU over to the RU, up to a predetermined threshold of RU processor loading. Similar decisions can be made based on base station operating parameters such as subcarrier spacing, where higher the subcarrier spacing, the more that processing can be shifted from the DU over to the RU due to smaller jitter buffer. Another approach would be for the split controller to decide the DU/RU functional split configuration based on operating conditions such as the distribution of UEs around RU. For example, if a number of UEs are concentrated closer in proximity to one RU than other RU served by the DU, then it makes sense for the DU to process downlink traffic using one of the delayed split, modulation split, or O-RAN split. Conversely, where UEs are spread relatively uniformly across the plurality of RUs served by the DU, then TBs can be more easily distributed to the RUs for processing using the early split option. Separate instances of the method 800 may also be performed to manage the DU/RU functional split configuration on a per-RU or per-BWP basis and independently for separate uplink and downlink channels.

FIG. 9 illustrates an example decision table 900 that may be utilized by a split controller 210 selecting a split configuration based on the determined current operating parameters or conditions. The decision criteria column includes each of the criteria considered by the split controller 210 when evaluating the current operating parameters or conditions. In alternate embodiments, the decision criteria may be listed in the order of importance, with the most significant criteria considered first. For each of the decision criteria, the decision table 900 then lists the various supported DU/RU functional splits in order of preference.

For example, if an RU 106 does not support the ability to dynamically control its functional split configuration (for example, if the RU is a 3rd Party RU or statically programmed only to utilize a standard O-RAN split), then RU support is the only relevant decision criteria to consider, and an O-RAN split is the first and only split option available for that RU 106. If the RU 106 does support dynamic control of functional split configurations, then the other decision criteria may be considered. For example, if the current priority is to reduce latency of fronthaul traffic between the DU 105 and RU 106, then per table 900 an early split is the functional split option of first choice, followed by delayed split, then modulation split, and then O-RAN split. That is, while the early split is the favored option to address the latency, current operating parameters or conditions may make the early split undesirable or unfeasible so that the second, third, or fourth choices need to instead be considered. In some embodiments, the various decision criteria may each be assigned a weighing factor so that the split controller 210 selects the split configuration by weighing each criteria and deciding the split based on the criteria that takes utmost importance (highest weight). In other embodiments, the split controller 210 applies the relative weighing factors and current operating parameters or conditions to an optimization algorithm to select a split option that best satisfies a combination of the various decision criteria. It should be appreciated that the split controller 210 may uses decision tables, such as decision table 900, in this manner to select a split configuration based on the determined one or more current operating parameters or conditions for payloads for PDSCH, PBCH, PDCCH, PRACH, PUSCH, PUCCH, or other channels communicated over the fronthaul network 125.

In order to better facilitate dynamic functional split configuration updates in real time, in some embodiments, the DU 105 and RU 106 (except for those RUs that do not support dynamic functional split configuration, for example) comprise the code and algorithms to perform the operational processes associated with each of the DU/RU functional split option pre-installed and then activate or deactivate which operational processes are currently executed based on the DU/RU functional split selected by the split controller 210. For example, an RU 106 may have preinstalled the algorithms to perform the modulation 310 and compression 312 processes, but those processes would both be deactivated when a modulation split 514 or O-RAN split 516 is selected by the split controller and activated with an early split 510 or delayed split 512 is selected by the split controller. Similarly, the associated DU 105 may have preinstalled the algorithms to perform the modulation 310 and compression 312 processes, but those processes would both be activated when a modulation split 514 or O-RAN split 516 is selected by the split controller and deactivated with an early split 510 or delayed split 512 is selected by the split controller. Switching functional split options can therefore be promptly reconfigured with the base station remaining in service by simply activating or deactivating the processes at the DU and RU associated with the functional split selected by the split controller.

Moreover, in some embodiments, functional split reconfiguration actions can be discerned from analysis of the structure or content of the traffic being received from the fronthaul. For example, the split controller 210 function as implemented at the RU 106 analyses the downlink traffic being generated by the DU 105 as it is being received from the fronthaul network 125. If the received traffic comprises unmodified transport blocks, then the split controller 210 function discerns that an early split 510 has been selected and activates the preinstalled the algorithms to perform the operational processes of the transmit chain 300 accordingly. If the received traffic instead comprises processed transport blocks up to but not including time domain processing 318, then the split controller 210 function discerns that an O-RAN split 516 has been selected and activates the preinstalled the algorithms to perform the time domain processing 318 and deactivates the other operational processes of the transmit chain 300 accordingly. The split controller 210 function would similarly discern from the received traffic when a delayed split 512 or modulation split 514 has been selected and activate and deactivate the operational processes of the transmit chain 300 accordingly. In a similar way, in some embodiments the split controller 210 function as implemented at the DU 105 may analyze the uplink traffic being generated by the RU 106 as it is being received from the fronthaul network 125. The split controller 210 function can discern from analysis of the structure or content of the traffic being received from the fronthaul whether an O-RAN split 640, a late split 650, or other functional split is in effect and activate and deactivate the operational processes of the receive chain 400 accordingly.

As mentioned above the compression performed at 312 may comprise standard O-RAN compression techniques, but in some embodiments may instead comprise an expanded bit depth compression technique to compress modulated symbols. FIGS. 10 and 10A provide tables that illustrate multipliers, standard compression bit depth, and the expanded bit depth compression proposed by this disclosure for sample modulation orders of QPSK, 16 QAM, 64 QAM and 256 QAM. As should be appreciated, the modulation orders shown in table 1000 are for example purposes and other modulation orders may be utilized in conjunction with the embodiments disclosed herein. A QPSK modulated IQ symbol can take on one of four complex values and thus a compression realized by mapping each of those four potential complex values to a scalar value that can be represented in binary by two bits. Similarly, a 16 QAM modulated IQ symbol can take on one of sixteen complex values and a compression realized by mapping each of those sixteen potential complex values to a scalar value that can be represented in binary by four bits, and so forth for 64 QAM, 256 QAM, and higher order modulations. When a decoder receives the binary scalar value, the original complex modulated IQ symbol can be recreated via a table by looking up the complex modulated IQ symbol that corresponds to the received binary scalar value.

The expanded bit depth compression proposed by this disclosure instead maps the complex modulated IQ symbol to pairs of multipliers for each of the real (in-phase, I) and imaginary (quadrature, Q) components of the complex modulated IQ symbol, adding two bits to the binary scalar value (as compared to the standard compression) but eliminating the need for the lookup table because the original complex modulated IQ symbol can be directly computed and obtained from the received expanded bit binary scalar value. For example, in case of QPSK, standard O-RAN compression requires the modulation points to be represented using the scalar values 0,1,2,3 that each requires 2 bits in binary (0b00, 0b01, 0b10, 0b11). In contrast, with the expanded bit-depth scheme, 4 bits are utilized with the most significant byte (MSB) of the 4-bit word corresponding to the I component of the original complex modulated IQ symbol (in both sign and value), and the least significant byte (LSB) of the 4 bit word corresponding to the Q component of the original complex modulated IQ symbol (in both sign and value). Here for QPKS, the MSB either has a value of 01 corresponding to an I value of 1, or a value of 11 corresponding to an I value of −1. Similarly, the LSB either has a value of 01 corresponding to a Q value of 1, or a value of 11 corresponding to a Q value of −1. Each of the possible QPSK complex modulation points of 1+li, 1−li, −1+li, and −1−li can be represented in 4-bit binary as 0101, 0111, 1101 and 1111 allowing a decoder to reconstruct the original complex modulated IQ symbol directly without reference to a lookup table. The same scheme applies to the other modulation orders. For example, a 16 QAM complex modulated IQ symbol would be mapped to a 3-bit MSB for the I component and a 3-bit LSB for the Q component.

This expanded bit-depth compression method brings in a tradeoff between fronthaul traffic rate and implementation complexity. That said, the relative cost of the increase in fronthaul traffic rate caused by the use of two extra bits diminishes as the modulation order increases. In other words, while for QPSK the added two bits doubles the size of the compressed IQ symbol from 2 to 4 (an increase of 100%), for 256 QAM the added two bits doubles only increases the size of the compressed IQ symbol from 8 to 10 (an increase of only 25%). What is gained is a decrease in implementation complexity as look-up tables for each modulation order need not be stored and references by the decoding operation.

EXAMPLE EMBODIMENTS

Example 1 includes a system for base station functional split management for uplink fronthaul traffic, the system comprising: a baseband controller coupled to a plurality of radio units via a fronthaul network, wherein the plurality of radio units comprise a signal zone from which uplink signals are combined by a base station; a split controller configured to dynamically select and control a functional split of a respective uplink receive chain between the baseband controller and each of the plurality of radio units; wherein the functional split defines a demarcation point on the uplink receive chain prior to which processing operations are executed by a radio unit and after which processing operations are executed by the baseband controller; wherein the split controller selects between a plurality of functional split options to dynamically control the functional split and the demarcation point.

Example 2 includes the system of Example 1, wherein each respective uplink receive chain comprises at least: a time domain processing operation; a channel estimation and interpolation operation; an equalization and antenna combining operation; a demodulation log-likelihood ratio (LLR) operation; and a channel decoding operation.

Example 3 includes the system of Example 2, wherein the time domain processing operation comprises one or both of a fast Fourier transform (FFT) operation or a cyclic prefix (CP) removal operations.

Example 4 includes the system of any of Examples 2-3, wherein the uplink receive chain further comprises an inverse discrete Fourier transform (IDFT) operation.

Example 5 includes the system of any of Examples 1-4, wherein the uplink receive chain is an uplink receive chain for a Physical Uplink Shared Channel (PUSCH) or a Physical Uplink Control Channel (PUCCH).

Example 6 includes the system of any of Examples 1-5, wherein the split controller selects the functional split and the demarcation point based on an optimum signal-to-noise ratio (SNR) for a target block error rate (BLER) performance.

Example 7 includes the system of any of Examples 1-6, wherein the split controller selects the functional split and the demarcation point based on a combination of an optimum signal-to-noise ratio (SNR) and a fronthaul throughput.

Example 8 includes the system of any of Examples 1-7, wherein the split controller selects the functional split and the demarcation point based on measurements from a physical random access channel (PRACH), sounding reference signal (SRS) channel or a physical uplink control channel (PUCCH), in conjunction with how many radio units form the signal zone from which the uplink signals are being combined.

Example 9 includes the system of any of Examples 1-8, further comprising one or more communications channels between the plurality of radio units; wherein interference rejection combining (IRC) is performed at a first radio unit of the plurality of radio units based on information communicated via the one or more communications channels.

Example 10 includes the system of any of Examples 1-9, wherein based on the functional split selected by the split controller, minimum mean square error (MMSE) or Interference Rejection Combining (IRC) combining is applied to uplink radio frequency (RF) signals received at antennas at each of the plurality of radio units and equalized signal combining is executed at the baseband controller.

Example 11 includes the system of Example 10, wherein each of the plurality of radio units sends average noise variance per physical resource block (PRB) information to the baseband controller to aid MMSE combining.

Example 12 includes the system of any of Examples 1-11, wherein a functional split option of the plurality of functional split options comprises an open radio access network (O-RAN) split, wherein the demarcation point is defined on the uplink receive chain after time domain processing operations are performed at a radio unit and prior to channel estimation and equalization and antenna combining processing operations.

Example 13 includes the system of Example 12, wherein an IQ symbol output of the time domain processing operations are compressed to m bits before transmission over the fronthaul network.

Example 14 includes the system of any of Examples 12-13, wherein uplink IQ signals from multiple radio units are combined at the baseband controller.

Example 15 includes the system of any of Examples 12-14, wherein uplink IQ signals from multiple radio points are combined at the baseband controller using Interference Rejection Combining (IRC).

Example 16 includes the system of any of Examples 1-15, wherein a functional split option of the plurality of functional split options comprises an estimation split, wherein the demarcation point is defined on the uplink receive chain after channel estimation and interpolation operations are performed at a radio unit and prior to antenna combining processing operations.

Example 17 includes the system of Example 16, wherein an IQ symbol output of the channel estimation and interpolation operations are compressed to m bits before transmission over the fronthaul network.

Example 18 includes the system of any of Examples 1-17, wherein a functional split option of the plurality of functional split options comprises an equalization-combining split, wherein the demarcation point is defined on the uplink receive chain after equalizing and combining antennas operations are performed at a radio unit and prior to demodulation and log-likelihood ratio processing operations.

Example 19 includes the system of Example 18, wherein at the equalizing and combining antennas operations performed at the radio unit, the received uplink signals are equalized and combined before transmission on the fronthaul network.

Example 20 includes the system of any of Examples 18-19, wherein equalized symbols along with side information is sent over the fronthaul network for processing or multi RU combining at the baseband controller.

Example 21 includes the system of any of Examples 18-20, wherein each radio unit of the plurality of radio units performs Interference Rejection Combining (IRC) for its own antennas.

Example 22 includes the system of any of Examples 18-21, wherein equalized samples along averaged noise variance per antenna are transmitted as side information over the fronthaul network to achieve minimum mean square error (MMSE) equalization and achieve radio unit combining at the baseband controller.

Example 23 includes the system of any of Examples 18-22, wherein an IQ symbol output of the equalizing and combining antennas operation are compressed to n bits before transmission over the fronthaul network.

Example 24 includes the system of any of Examples 1-23, wherein a functional split option of the plurality of functional split options comprises an inverse discrete Fourier transform (IDFT) split, wherein the demarcation point is defined on the uplink receive chain after IDFT processing operations are performed at a radio unit and prior to demodulation and log-likelihood ratio processing operations.

Example 25 includes the system of Example 24, wherein an IQ symbol output of the IDFT processing operations are compressed to n bits before transmission over the fronthaul network.

Example 26 includes the system of any of Examples 1-25, wherein a functional split option of the plurality of functional split options comprises a demodulation split, wherein the demarcation point is defined on the uplink receive chain after demodulation log-likelihood ratio (LLR) operations are performed at a radio unit and prior to decoding processing operations.

Example 27 includes the system of Example 26, wherein demodulation is performed at the radio unit and resulting demodulated soft decisions per layer are transmitted over the fronthaul network to the baseband controller.

Example 28 includes the system of any of Examples 26-27, wherein soft decisions from multiple radio units are received and combined at the baseband controller prior to channel decoding to improve signal-to-noise (SNR) performance.

Example 29 includes the system of any of Examples 26-28, wherein a soft decisions output of the demodulation LLR operations is compressed to p bits per layer before transmission over the fronthaul network.

Example 30 includes the system of any of Examples 1-29, wherein a functional split option of the plurality of functional split options comprises a late split, wherein the demarcation point is defined on the uplink receive chain after decoding of the demodulated soft decision and resulting decoded bits are transmitted as a decoded transport block on the fronthaul network.

Example 31 includes the system of any of Examples 1-30, wherein the split controller individually selects the functional split for the respective uplink receive chain for each of the plurality of radio units.

Example 32 includes the system of any of Examples 1-31, wherein the fronthaul network is a switched Ethernet network.

Example 33 includes the system of any of Examples 1-32, wherein the fronthaul network is an Internet Protocol (IP) network.

Example 34 includes the system of any of Examples 1-33, wherein the base station comprises either a eNodeB base station or a gNodeB base station.

Example 35 includes the system of any of Examples 1-34, wherein the baseband controller comprises at least one central unit (CU) and at least one distributed unit (DU), wherein the plurality of radio units are coupled to the at least one DU by the fronthaul network.

Example 36 includes a method for base station functional split management for uplink fronthaul traffic, wherein a base station comprises a baseband controller coupled to a plurality of radio units via a fronthaul network, wherein the plurality of radio units comprise a signal zone from which uplink signals are combined by the base station, the method comprising: determining one or more current operating parameters or conditions; dynamically selecting, based on the one or more current operating parameters or conditions, a functional split of a respective uplink receive chain between the baseband controller and each of the plurality of radio units, wherein the functional split defines a demarcation point on the uplink receive chain prior to which processing operations are executed by a radio unit and after which processing operations are executed by the baseband controller; wherein a split controller selects between a plurality of functional split options to dynamically control the functional split and the demarcation point.

Example 37 includes the method of Example 36, wherein the uplink receive chain is an uplink receive chain for a Physical Uplink Shared Channel (PUSCH) or a Physical Uplink Control Channel (PUCCH).

Example 38 includes the method of any of Examples 36-37, wherein the split controller selects the functional split based on an optimum signal-to-noise ratio (SNR) for a target block error rate (BLER) performance.

Example 39 includes the method of any of Examples 36-38, wherein the split controller selects the functional split based on a combination of an optimum signal-to-noise ratio (SNR) and a fronthaul throughput.

Example 40 includes the method of any of Examples 36-39, wherein the split controller selects the functional split based on measurements from a physical random access channel (PRACH), sounding reference signal (SRS) channel or a physical uplink control channel (PUCCH), in conjunction with how many radio units form the signal zone from which the uplink signals are being combined.

Example 41 includes a system for base station functional split management for downlink fronthaul traffic, the system comprising: a baseband controller coupled to a plurality of radio units via a fronthaul network; a split controller configured to dynamically select and control a functional split of a respective downlink transmit chain between the baseband controller and each of the plurality of radio units; wherein the functional split defines a demarcation point on the downlink transmit chain prior to which processing operations are executed by the baseband controller and after which processing operations are executed by a radio unit; wherein the split controller selects between a plurality of functional split options to dynamically control the functional split and the demarcation point.

Example 42 includes the system of Example 41, wherein the downlink transmit chain is a downlink transmit chain for a Physical Downlink Shared Channel (PDSCH), a Physical Broadcast Channel (PBCH), a Physical Downlink Control Channel (PDCCH), a Demodulation Reference Signal (DMRS), a Primary Secondary Signal (PSS), a Secondary Synchronization Signal (SSS) or a Channel State Information Reference Signal (CSI-RS).

Example 43 includes the system of any of Examples 41-42, wherein the split controller determines one or more operating parameters or conditions and selects the functional split and the demarcation point based on the one or more operating parameters or conditions.

Example 44 includes the system of Example 43, wherein the one or more operating parameters or conditions comprise system factor or fronthaul network factors that include at least one of: base station loading, fronthaul bandwidth, fronthaul traffic congestion, subcarrier spacing, radio unit processing capacity, reuse scaling, user equipment distribution within a cell, or equipment interoperability.

Example 45 includes the system of any of Examples 43-44, wherein the split controller determines and selects the functional split and the demarcation point based on a decision table comprising a plurality of decision criteria, wherein for each of the plurality of decision criteria the decision table associated one or more of the plurality of functional split options.

Example 46 includes the system of Example 45, wherein the decision criteria are each assigned a weighing factor, wherein the split controller selects a split configuration option based on the weighing factor.

Example 47 includes the system of any of Examples 45-46, wherein the decision criteria are each assigned a relative weighing factor, wherein the split controller applies the relative weighing factor and current operating parameters or conditions to an optimization algorithm to select the functional split.

Example 48 includes the system of any of Examples 41-47, wherein the split controller individually selects the functional split for the respective downlink transmit chain for each of the plurality of radio units.

Example 49 includes the system of any of Examples 41-48, wherein each respective downlink transmit chain comprises at least: a transport block (TB) Cyclic Redundancy Code (CRC) attachment operation; a code block concatenation and scrambling operation; a modulation operation; a layer mapping (LM) and precoding operation; a resource element mapping operation; and a time domain processing operation.

Example 50 includes the system of Example 49, wherein the modulation operation further includes a compression operation, wherein the compression operation applies an expanded bit-depth compression algorithm to complex modulated IQ symbols to generate a scalar value, wherein a first n bits are corresponding to an I component of an original complex modulated IQ symbol and a second n bits are corresponding to an Q component of the original complex modulated IQ symbol.

Example 51 includes the system of any of Examples 41-50, wherein a functional split option of the plurality of functional split options comprises an early split, wherein the demarcation point is defined at a start of the downlink transmit chain prior to scrambling, where an unprocessed transport block payload is forwarded from the baseband controller to a radio unit on the fronthaul network.

Example 52 includes the system of any of Examples 41-51, wherein a functional split option of the plurality of functional split options comprises a delayed split, wherein the demarcation point is defined on the downlink transmit chain after a scrambling operation is performed at the baseband controller and prior to a modulation processing operation performed at a radio unit.

Example 53 includes the system of any of Examples 41-52, wherein a functional split option of the plurality of functional split options comprises a modulation split, wherein the demarcation point is defined on the downlink transmit chain after modulation and compression operations are performed at the baseband controller and prior to a decompression, layer mapping (LM) and precoding processing operation processing's are performed at a radio unit.

Example 54 includes the system of any of Examples 41-53, wherein a functional split option of the plurality of functional split options comprises an open radio access network (O-RAN) split, wherein the demarcation point is defined on the downlink transmit chain after resource mapping performed at the baseband controller and prior to time domain processing operations performed at a radio unit.

Example 55 includes the system of any of Examples 41-54, wherein one or more of the plurality of radio units are configured to discern the functional split selected by the split controller based on an analysis of structure or content of traffic being received from the fronthaul network.

Example 56 includes the system of any of Examples 41-55, wherein the fronthaul network is a switched Ethernet network.

Example 57 includes the system of any of Examples 41-56, wherein the fronthaul network is an Internet Protocol (IP) network.

Example 58 includes the system of any of Examples 41-57, wherein the base station comprises either a eNodeB base station or a gNodeB base station.

Example 59 includes the system of any of Examples 41-58, wherein the baseband controller comprises at least one central unit (CU) and at least one distributed unit (DU), wherein the plurality of radio units are coupled to the at least one DU by the fronthaul network.

Example 60 includes a method for base station functional split management for downlink fronthaul traffic, wherein a base station comprises a baseband controller coupled to a plurality of radio units via a fronthaul network, the method comprising: determining one or more current operating parameters or conditions; dynamically selecting, based on the one or more current operating parameters or conditions, a functional split of a respective downlink transmit chain between the baseband controller and each of the plurality of radio units, wherein the functional split defines a demarcation point on the downlink transmit chain prior to which processing operations are executed by the baseband controller and after which processing operations are executed by a radio unit; wherein a split controller selects between a plurality of functional split options to dynamically control the functional split and the demarcation point.

Example 61 includes the method of Example 60, further comprising: determining, with the split controller, when the radio unit supports dynamic functional split configuration; and when the radio unit cannot support dynamic split configuration, processing transport blocks using an open radio access network (O-RAN) split.

Example 62 includes the method of any of Examples 60-61, wherein the downlink transmit chain is a downlink transmit chain for a Physical Downlink Shared Channel (PDSCH), a Physical Broadcast Channel (PBCH), or a Physical Downlink Control Channel (PDCCH).

Example 63 includes the method of any of Examples 60-62, wherein the split controller determines one or more operating parameters or conditions and selects the functional split and the demarcation point based on the one or more operating parameters or conditions.

Example 64 includes the method of Example 63, wherein the one or more operating parameters or conditions comprise system factor or fronthaul network factors that include at least one of: base station loading, fronthaul bandwidth, fronthaul traffic congestion, subcarrier spacing, radio unit processing capacity, reuse scaling, user equipment distribution within a cell, or equipment interoperability.

Example 65 includes the method of any of Examples 60-64, wherein a functional split option of the plurality of functional split options comprises an early split, wherein the demarcation point is defined at a start of the downlink transmit chain prior to scrambling, where an unprocessed transport block payload is forwarded from the baseband controller to a radio unit on the fronthaul network.

Example 66 includes the method of any of Examples 60-65, wherein a functional split option of the plurality of functional split options comprises a delayed split, wherein the demarcation point is defined on the downlink transmit chain after a scrambling operation is performed at the baseband controller and prior to a modulation processing operation performed at a radio unit.

Example 67 includes the method of any of Examples 60-66, wherein a functional split option of the plurality of functional split options comprises a modulation split, wherein the demarcation point is defined on the downlink transmit chain after modulation and compression operations are performed at the baseband controller and prior to a decompression, layer mapping (LM) and precoding processing operation processing's are performed at a radio unit.

Example 68 includes the method of any of Examples 60-67, wherein a functional split option of the plurality of functional split options comprises an open radio access network (O-RAN) split, wherein the demarcation point is defined on the downlink transmit chain after resource mapping performed at the baseband controller and prior to time domain processing operations performed at a radio unit.

Example 69 includes the method of any of Examples 60-68, further comprising: discerning, at one or more of the plurality of radio units, the functional split selected by the split controller based on an analysis of structure or content of traffic being received from the fronthaul network.

In various alternative embodiments, system and/or device elements, method steps, or example implementations described throughout this disclosure (such as any of the base stations, baseband controller, baseband unit, radio units, CU, CU-CP, CU-UP, DU. core network, split controller, MAC scheduler, device management system, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, cloud-based virtualized wireless base station related terms such as base stations, baseband controller, baseband unit, radio units, CU, CU-CP, CU-UP, DU. core network, split controller, MAC scheduler, device management system, fronthaul network, backhaul network, or sub-parts thereof, refer to non-generic elements as would recognized and understood by those of skill in the art of telecommunications and networks and are not used herein as nonce words or nonce terms for the purpose of invoking 35 USC 112 (f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system for base station functional split management for uplink fronthaul traffic, the system comprising:
   a baseband controller coupled to a plurality of radio units via a fronthaul network, wherein the plurality of radio units comprise a signal zone from which uplink signals are combined by a base station;
   a split controller configured to dynamically select and control a functional split of a respective uplink receive chain between the baseband controller and each of the plurality of radio units;
   wherein the functional split defines a demarcation point on the uplink receive chain prior to which processing operations are executed by a radio unit and after which processing operations are executed by the baseband controller;
   wherein the split controller selects between a plurality of functional split options to dynamically control the functional split and the demarcation point.

2. The system of claim 1, further comprising one or more communications channels between the plurality of radio units;
   wherein interference rejection combining (IRC) is performed at a first radio unit of the plurality of radio units based on information communicated via the one or more communications channels.

3. The system of claim 1, wherein based on the functional split selected by the split controller, minimum mean square error (MMSE) or Interference Rejection Combining (IRC) combining is applied to uplink radio frequency (RF) signals received at antennas at each of the plurality of radio units and equalized signal combining is executed at the baseband controller.

4. The system of claim 1, wherein a functional split option of the plurality of functional split options comprises an open radio access network (O-RAN) split, wherein the demarcation point is defined on the uplink receive chain after time domain processing operations are performed at a radio unit and prior to channel estimation and equalization and antenna combining processing operations.

5. The system of claim 1, wherein a functional split option of the plurality of functional split options comprises an estimation split, wherein the demarcation point is defined on the uplink receive chain after channel estimation and interpolation operations are performed at a radio unit and prior to antenna combining processing operations.

6. The system of claim 1, wherein a functional split option of the plurality of functional split options comprises an equalization-combining split, wherein the demarcation point is defined on the uplink receive chain after equalizing and combining antennas operations are performed at a radio unit and prior to demodulation and log-likelihood ratio processing operations.

7. The system of claim 1, wherein a functional split option of the plurality of functional split options comprises an inverse discrete Fourier transform (IDFT) split, wherein the demarcation point is defined on the uplink receive chain after IDFT processing operations are performed at a radio unit and prior to demodulation and log-likelihood ratio processing operations.

8. The system of claim 1, wherein a functional split option of the plurality of functional split options comprises a demodulation split, wherein the demarcation point is defined on the uplink receive chain after demodulation log-likelihood ratio (LLR) operations are performed at a radio unit and prior to decoding processing operations.

9. The system of claim 1, wherein a functional split option of the plurality of functional split options comprises a late split, wherein the demarcation point is defined on the uplink receive chain after decoding of the demodulated soft decision and resulting decoded bits are transmitted as a decoded transport block on the fronthaul network.

10. The system of claim 1, wherein the split controller individually selects the functional split for the respective uplink receive chain for each of the plurality of radio units.

11. A method for base station functional split management for uplink fronthaul traffic, wherein a base station comprises a baseband controller coupled to a plurality of radio units via a fronthaul network, wherein the plurality of radio units comprise a signal zone from which uplink signals are combined by the base station, the method comprising:
   determining one or more current operating parameters or conditions;
   dynamically selecting, based on the one or more current operating parameters or conditions, a functional split of a respective uplink receive chain between the baseband controller and each of the plurality of radio units, wherein the functional split defines a demarcation point on the uplink receive chain prior to which processing operations are executed by a radio unit and after which processing operations are executed by the baseband controller;
   wherein a split controller selects between a plurality of functional split options to dynamically control the functional split and the demarcation point.

12. The method of claim 11, wherein the uplink receive chain is an uplink receive chain for a Physical Uplink Shared Channel (PUSCH) or a Physical Uplink Control Channel (PUCCH).

13. The method of claim 11, wherein the split controller selects the functional split based on an optimum signal-to-noise ratio (SNR) for a target block error rate (BLER) performance or based on a combination of an optimum SNR and a fronthaul throughput.

14. The method of claim 11, wherein the split controller selects the functional split based on measurements from a physical random access channel (PRACH), sounding reference signal (SRS) channel or a physical uplink control channel (PUCCH), in conjunction with how many radio units form the signal zone from which the uplink signals are being combined.

15. A system for base station functional split management for downlink fronthaul traffic, the system comprising:
   a baseband controller coupled to a plurality of radio units via a fronthaul network;
   a split controller configured to dynamically select and control a functional split of a respective downlink transmit chain between the baseband controller and each of the plurality of radio units;
   wherein the functional split defines a demarcation point on the downlink transmit chain prior to which processing operations are executed by the baseband controller and after which processing operations are executed by a radio unit;

wherein the split controller selects between a plurality of functional split options to dynamically control the functional split and the demarcation point.

16. The system of claim 15, wherein the downlink transmit chain is a downlink transmit chain for a Physical Downlink Shared Channel (PDSCH), a Physical Broadcast Channel (PBCH), a Physical Downlink Control Channel (PDCCH), a Demodulation Reference Signal (DMRS), a Primary Secondary Signal (PSS), a Secondary Synchronization Signal (SSS) or a Channel State Information Reference Signal (CSI-RS).

17. The system of claim 15, wherein the split controller determines one or more operating parameters or conditions and selects the functional split and the demarcation point based on the one or more operating parameters or conditions.

18. The system of claim 17, wherein the split controller determines and selects the functional split and the demarcation point based on a decision table comprising a plurality of decision criteria, wherein for each of the plurality of decision criteria the decision table associated one or more of the plurality of functional split options.

19. The system of claim 15, wherein the split controller individually selects the functional split for the respective downlink transmit chain for each of the plurality of radio units.

20. The system of claim 15, wherein the split controller is further configured to:

determine when the radio unit supports a dynamic functional split configuration; and when the radio unit cannot support dynamic split configuration, process transport blocks using an open radio access network (O-RAN) split.

* * * * *